United States Patent
Liu et al.

(10) Patent No.: US 11,611,960 B2
(45) Date of Patent: *Mar. 21, 2023

(54) INFORMATION TRANSMISSION METHOD AND DEVICE BASED ON SWEEPING BLOCK

(71) Applicant: ZTE CORPORATION, Guangdong (CN)

(72) Inventors: Xing Liu, Shenzhen (CN); Feng Bi, Shenzhen (CN); Junfeng Zhang, Shenzhen (CN); Peng Hao, Shenzhen (CN); Bo Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/158,916

(22) Filed: Jan. 26, 2021

(65) Prior Publication Data

US 2021/0227539 A1    Jul. 22, 2021

Related U.S. Application Data

(63) Continuation of application No. 16/323,339, filed as application No. PCT/CN2017/082899 on May 3, 2017, now Pat. No. 10,917,887.

(30) Foreign Application Priority Data

Aug. 12, 2016  (CN) .......................... 201610669806.9

(51) Int. Cl.
*H04W 72/04* (2009.01)
*H04L 5/00* (2006.01)
(Continued)

(52) U.S. Cl.
CPC ....... *H04W 72/0446* (2013.01); *H04L 5/0048* (2013.01); *H04W 72/04* (2013.01); *H04W 72/0453* (2013.01)

(58) Field of Classification Search
CPC ......... H04W 72/0446; H04W 72/0473; H04W 72/0453; H04W 72/04; H04W 72/044;
(Continued)

(56) References Cited

U.S. PATENT DOCUMENTS 9,872,258 B1    1/2018  Mansour et al.
2014/0328302 A1  11/2014  Park et al.
(Continued)

FOREIGN PATENT DOCUMENTS

CN    101425991 A    5/2009
CN    105027524 A    11/2015
(Continued)

OTHER PUBLICATIONS

Extended European Search Report on EP 17838384.0 dated Feb. 25, 2020 (6 pages).
(Continued)

*Primary Examiner* — Phong La
(74) *Attorney, Agent, or Firm* — Foley & Lardner LLP

(57) ABSTRACT

The present disclosure provides an information transmission method and device based on a sweeping block. The method includes: configuring part of or all symbols of a data transmission subframe within a sweeping period as a sweeping block; and carrying a sweeping signal channel in the sweeping block for transmission. The sweeping signal channel refers to a signal or a signal and channel to be transmitted by polling all ports or beams. The above solution can improve flexibility and efficiency of data beam transmission and reduce a latency of traffic transmission.

13 Claims, 27 Drawing Sheets

(51) Int. Cl.
*H04W 72/0446* (2023.01)
*H04W 72/0453* (2023.01)

(58) Field of Classification Search
CPC ... H04W 72/046; H04W 72/02; H04W 72/12; H04L 5/0048; H04L 5/0051; H04L 5/0053; H04L 5/0058; H04L 5/0032; H04L 27/2611
See application file for complete search history.

(56) References Cited

U.S. PATENT DOCUMENTS

| | | | |
|---|---|---|---|
| 2015/0124736 A1* | 5/2015 | Ko | H04B 7/0626 370/329 |
| 2015/0304062 A1 | 10/2015 | Teyeb et al. | |
| 2017/0013481 A1 | 1/2017 | Wang et al. | |
| 2017/0303141 A1* | 10/2017 | Islam | H04B 7/088 |
| 2017/0353254 A1* | 12/2017 | Islam | H04L 27/2692 |
| 2018/0062810 A1 | 3/2018 | Vitthaladevuni et al. | |
| 2019/0239204 A1 | 8/2019 | Zhang et al. | |
| 2019/0313442 A1* | 10/2019 | Hosseini | H04W 72/0473 |
| 2019/0319686 A1* | 10/2019 | Chen, IV | H04W 72/046 |

FOREIGN PATENT DOCUMENTS

| | | |
|---|---|---|
| JP | 2014-520433 A | 8/2014 |
| WO | WO-2016/049840 A1 | 4/2016 |

OTHER PUBLICATIONS

First Chinese Office Action on CN 201610669806.9 dated Mar. 3, 2020 (22 pages).
International Search Report and Written Opinion for International Appl. No. PCT/CN2017/082899, dated Jul. 24, 2017.
Mitsubishi Electric: "Beam control operation for common channels/signals in NR" 3GPP TSG-RAN WG1 #86; R1-166228; Aug. 26, 2016; Gothenburg, Sweden (12 pages).
Nokia et al., "Support for Beam Based Common Control Plane, RI-165364", 3GPP TSG-RAN WG1#85, May 27, 2016 (May 27, 2016), section 2, and figure 1, pp. 1-4.
Non-Final Office Action on U.S. Appl. No. 16/323,339 dated May 26, 2020.
Notice or Allowance on U.S. Appl. No. 16/323,339 dated Oct. 6, 2020.
Samsung , "Framework for Beamformed Access, RI-164013", 3GPP TSG RAN WG1#85, May 27, 2016 (May 27, 2016), the whole document, pp. 1-4.

* cited by examiner

INFORMATION TRANSMISSION METHOD AND DEVICE BASED ON SWEEPING BLOCK

CROSS-REFERENCE TO RELATED APPLICATIONS

This application claims the benefit of priority under 35 U.S.C. § 120 as a continuation of U.S. Non-Provisional patent application Ser. No. 16/323,339, filed on May 3, 2017, which is a U.S. National Stage Application under 35 U.S.C. 371 of International Patent Application No. PCT/CN2017/082899, filed on May 3, 2017, which claims priority to Chinese Patent Application No. 201610669806.9, filed on Aug. 12, 2016, the content of each of which is incorporated herein by reference in their entireties.

TECHNICAL FIELD

The present disclosure relates to, but is not limited to, the field of mobile communications and, in particular, relates to an information transmission method and device based on a sweeping block.

BACKGROUND

With continuous advance in radio technologies, various radio services are flourishing. However, frequency spectrum resources for supporting the radio services are limited. With the increasing demand for bandwidth, the frequency spectrum resources of 300 MHz to 3 GHz mainly used in the traditional commercial communications are extremely strained and cannot meet requirements of the future wireless communications.

In the future wireless communications, communications will be performed by adopting a carrier frequency, such as 28 GHz, 45 GHz and 70 GHz, higher than the carrier frequency adopted by the fourth-generation (4G) communication system. This type of high frequency channel has defects of a larger free propagation loss, being easily absorbed by oxygen and being affected by rain attenuation, which seriously affects coverage performance of the high frequency communication system. However, the carrier frequency of the high frequency communications has a shorter wavelength, so more antenna elements can be accommodated in per unit area. The more antenna elements mean that a beamforming method can be adopted to improve antenna gains, thereby ensuring the coverage performance of the high frequency communications.

With the beamforming method, the transmitting end may concentrate transmit energy in a certain direction, and the transmit energy is small or no in other directions, that is, each beam has its own directivity and can only cover the terminals in a certain direction. The transmitting end, the base station, needs to transmit beams in dozens or even hundreds of directions to implement a full coverage. In the existing art, the preliminary measurement and identification of beam directions are performed in the initial access process of the terminal to the network, and all the transmitting beams of the base station are polled in a time period for the terminal to measure and identify a preferred beam or port. As shown in FIG. 1, a downlink (DL) beam sweeping subframe includes several continuous beam sweeping blocks (such as grid areas in FIG. 1). Within each beam sweeping block, a synchronization signal (SS) and system information (SI) may be transmitted on multiple beams or ports according to the number of radio frequency links of the base station, and a beam reference signal (BRS)/port reference signal may also be transmitted. The terminal identifies the preferred downlink transmit beam or port and acquires the basic information of the cell and access configuration information by measuring the synchronization signals, acquiring the system information and measuring the optional reference signals, to access the network. Similarly, there are also consecutive sweeping blocks in the uplink.

In such a process, with an increased operating frequency band of the system, the required beamforming gains also increase, which means that a more "narrow" beam is required to cover the expected range. The number of beams may be dozens or even hundreds, and the number of the required beam sweeping blocks is increased accordingly, so the total length of the beam sweeping subframe will be too long. Moreover, since the directions of the transmit beams are polled in a pre-defined order within the beam sweeping subframe and cannot meet the different data transmission requirements of different beams, that is, the data subframe configuration of the beam direction in which data may be sent needs to wait for the completing of the subframe sweeping. If the time occupied by polling all the beams (the beam sweeping subframe) is too long, the flexibility and efficiency of beam transmission of data are affected and a latency of traffic transmission is also increased. In addition, if the transmission direction frequently changes in the sweeping block, the hardware costs and overheads of the base station are increased.

SUMMARY

The following is a summary of the subject matter described herein in detail. This summary is not intended to limit the scope of the claims.

Embodiments of the present disclosure provide an information transmission method and device based on a sweeping block to improve flexibility and efficiency of data beam transmission and reduce a latency of traffic transmission.

The embodiments of the present disclosure provide an information transmission method based on a sweeping block. The method includes: configuring part of or all of symbols of a data transmission subframe within a sweeping period to the sweeping block; and carrying a sweeping signal channel in the sweeping block for transmission. The sweeping signal channel refers to signals or signals and channels to be transmitted by polling all ports or beams.

The embodiments of the present disclosure further provide an information transmission device based on a sweeping block. The device includes a configuration module and a transmission module. The configuration module is configured to configure part of or all symbols of a data transmission subframe within a sweeping period to a sweeping block. The transmission module is configured to carry a sweeping signal channel in the sweeping block for transmission. The sweeping signal channel refers to a signal or a signal and channel to be transmitted by polling all ports or beams.

The embodiments of the present disclosure further provide an electronic device, including the information transmission device based on the sweeping block described above.

The embodiments of the present disclosure further provide an electronic device, including a processor and a memory storing instructions executable by the processor. The instructions, when executed by the processor, perform the following operations: configuring part of or all symbols of a data transmission subframe within a sweeping period as the sweeping block; and carrying a sweeping signal channel in the sweeping block for transmission. The sweeping signal channel refers to a signal or a signal and channel to be transmitted by polling all ports or beams.

The embodiments of the present disclosure further provide a machine-readable medium configured to store computer-executable instructions for executing the information transmission method based on the sweeping block described above when executed by a processor.

The embodiments of the present disclosure provide an information transmission method and device based on a sweeping block, a new beam/port sweeping resource structure is defined and sweeping blocks are distributed and inserted into the data transmission subframe, that is, the some or all symbols of the data transmission subframe within the sweeping period are configured as the sweeping block. In addition, a downlink control region in the data transmission subframe may schedule resources in the sweeping block other than the sweeping signal channel to transmit data on the same port or the same beam.

Compared with the existing art, under the premise of ensuring a same number of sweeping blocks within the sweeping period (i.e., without increasing a sweeping latency), the data transmission is more flexible and it is easier to utilize the remaining resources within the sweeping block, thereby improving resource utilization efficiency. In addition, a sweeping subframe includes a reduced number of sweeping blocks and a total length of the sweeping subframe is reduced, thereby reducing an impact on a traffic transmission latency due to the transmission of the sweeping subframe. In addition, the embodiments of the present disclosure may support that symbols outside a reserved region in the data transmission subframe are configured as the sweeping block so that the sweeping block does not affect the transmission of original port control information, that is, important information may be transmitted on the predetermined port, which greatly improves system stability.

Other aspects can be understood after the drawings and detailed description are read and understood.

DETAILED DESCRIPTION

Embodiments of the present disclosure will be described in detail in conjunction with the drawings, and it should be understood that the embodiments described hereinafter are intended to describe and explain the present application and not to limit the present application.

It is to be noted that in the present application, a sweeping time interval may also be referred to as a sweeping subframe or a beam sweeping time interval or beam sweeping subframe; and a data transmission subframe may also be referred to as a data transmission time interval. The sweeping time interval may be one or more continuous data transmission subframes. A sweeping time block may also be referred to as a sweeping block or a beam sweeping time block or a beam sweeping block. In addition, the term "beam" and the term "port" have the same meaning, which are not distinguished and may be commonly used herein.

Figure 1:
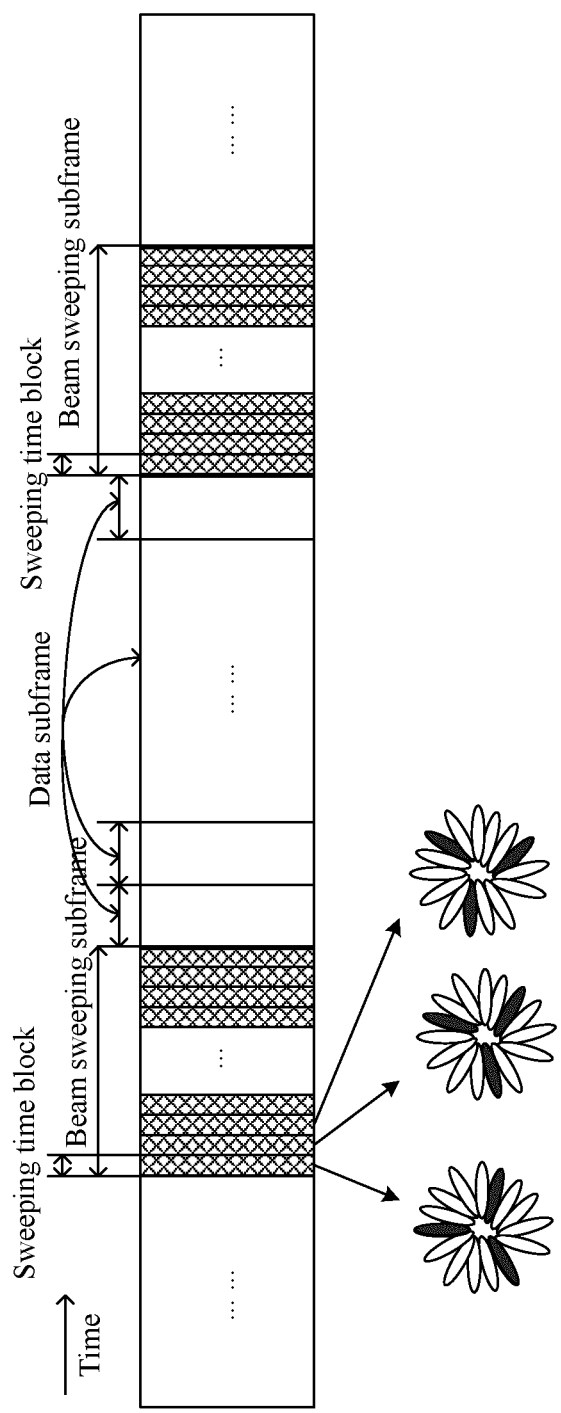
FIG. 1 is a structure diagram of a continuous sweeping subframe in the existing art.
Figure 2:
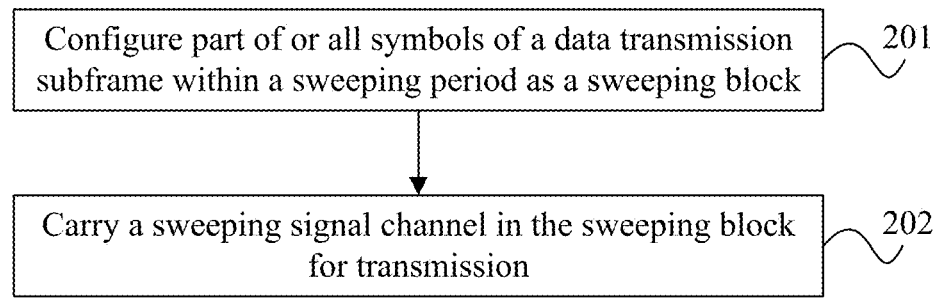
FIG. 2 is a flowchart of an information transmission method based on a sweeping block according to an embodiment of the present disclosure.

An embodiment of the present disclosure provides an information transmission method based on a sweeping block. As shown in FIG. 2, the information transmission method based on the sweeping block in the embodiment includes the steps described below.

In step 201, part of or all symbols of a data transmission subframe within a sweeping period are configured as a sweeping block.

In step 202, a sweeping signal channel is carried in the sweeping block for transmission.

The sweeping signal channel refers to a signal or a signal and channel need to be transmitted by polling all ports or beams.

The step 201 may include configuring part of or all symbols of at least one data transmission subframe within the sweeping period as at least one sweeping block.

Part of the symbols of one data transmission subframe within the sweeping period may be configured as one or more sweeping blocks. Alternatively, all symbols of one data transmission subframe within the sweeping period may be configured as one or more sweeping blocks. Alternatively, part of or all symbols of each of multiple data transmission subframes within the sweeping period may be configured as one sweeping block. Alternatively part or all symbols of each of multiple data transmission subframes within the sweeping period may be configured as multiple sweeping blocks. That is, one data transmission subframe within the sweeping period may be configured with one or more sweeping blocks, and each sweeping block occupies at least one symbol. Alternatively, each of multiple data transmission subframes within the sweeping period is configured with at least one sweeping block, and each sweeping block occupies at least one symbol.

In an exemplary embodiment, the step 201 may include: for each of one or more data transmission subframes within the sweeping period, configuring symbols, outside a reserved region, of the data transmission subframe as one or more sweeping blocks.

In an exemplary embodiment, after the symbols, outside the reserved region, of each of one or more data transmission subframes within the sweeping period are configured as one or more sweeping blocks, the data transmission subframe configured with the sweeping block has any one of the following structures:

a combination of a downlink control region and a downlink sweeping block;

a combination of the downlink control region, a guard period and an uplink sweeping block;

a combination of the downlink control region, the downlink sweeping block, the guard period and an uplink control region;

a combination of the downlink control region, the guard period, the uplink sweeping block and the uplink control region; and a combination of the downlink control region, the downlink sweeping block, the guard period, the uplink sweeping block and the uplink control region.

The downlink control region, the downlink sweeping block, the guard period, the uplink sweeping block and the uplink control region each comprise at least one symbol such as an orthogonal frequency division multiplexing (OFDM) symbol.

In an exemplary embodiment, the step of configuring the symbols, outside the reserved region, of each of at least one data transmission subframe within the sweeping period as one or more sweeping blocks may include: configuring all symbols except the reserved region of each of at least one continuous data transmission subframe within the sweeping period as the sweeping block. After all the symbols except the reserved region of the at least one continuous data transmission subframe within the sweeping period are configured as the sweeping block, the at least one continuous data transmission subframe configured with the sweeping block constitutes a sweeping time interval.

In an exemplary embodiment, the reserved region may include at least one of the downlink control region and the uplink control region.

In an exemplary embodiment, the step in which part of or all symbols of the data transmission subframe within the sweeping period are configured as the sweeping block may include: configuring all symbols of each of at least one continuous data transmission subframe within the sweeping period as the sweeping block. After all the symbols of each of the at least one continuous data transmission subframe within the sweeping period are configured as the sweeping block, the at least one continuous data transmission subframe configured with the sweeping block constitute the sweeping time interval.

In such configurations, a length of the sweeping time interval is a multiple of a length of the data transmission subframe, unlike the existing art in which the length of the sweeping time interval is an arbitrary number irrelevant to the length of the data transmission subframe. Such configuration does not change a potential position of a start point of the data transmission subframe, that is, a terminal may determine the starting point of the subframe according to a fixed subframe length and performs control channel blind detection at the starting point of the subframe. However, in the existing art, the sweeping time interval is not directly related to the length of the data transmission subframe. As a result, the starting position of the data transmission subframe is no longer fixed if the sweeping time interval is inserted, and the terminal needs to perform the blind detection by symbols to ensure that the control channel at the starting point of the data transmission subframe is not missed. Blind detection complexity is increased for the terminal.

In an exemplary embodiment, the step of configuring part or all symbols of the data transmission subframe within the sweeping period as the sweeping block may include: configuring part of or all symbols of the data transmission subframe within the sweeping period as one sweeping block. That is, merely one sweeping block is configured in the data transmission subframe.

After part of or all symbols of the data transmission subframe within the sweeping period are configured as one sweeping block, a port or beam of the data transmission subframe is a subset or a full set of ports or beams of the one sweeping block.

In an exemplary embodiment, the sweeping period may refer to a time period during which the sweeping signal channel transmitted by polling all ports or beams for one time, and the sweeping period includes a plurality of subframes. In an exemplary embodiment, the sweeping period is predefined as any one of 5 ms, 10 ms, 20 ms, 40 ms and 80 ms.

In an exemplary embodiment, the sweeping period includes at least one sweeping block, and each sweeping block is used for transmitting the sweeping signal channel of at least one port and occupies at least one symbol. The sweeping signal channel is transmitted on all ports or beams in the sweeping period.

In an exemplary embodiment, the sweeping block includes at least one of the downlink sweeping block and the uplink sweeping block; and the sweeping signal channel includes at least one of an uplink sweeping signal channel and a downlink sweeping signal channel. The downlink sweeping block carries the downlink sweeping signal channel used for at least one of: a cell search, and measurement and identification of a downlink port or beam. The downlink sweeping signal channel includes at least one of the following corresponding to the downlink port or beam: a downlink synchronization signal, system information and a downlink port reference signal. The uplink sweeping block carries the uplink sweeping signal channel used for at least one of: uplink access, and measurement and identification of an uplink port or beam. The uplink sweeping signal channel includes at least one of the followings corresponding to the uplink port or beam: an uplink random access request signal and an uplink port reference signal.

In an exemplary embodiment, the sweeping signal channel in the sweeping block is further used for indicating time domain position information of the sweeping block. The time domain position information includes at least one of: a frame in which the sweeping block is located, a subframe in which the sweeping block is located, and a position of the sweeping block in the subframe. The position of the sweeping time block in the subframe refers to information on which symbols of the subframe are occupied by the sweeping block, or offset information between the sweeping block and a boundary of the subframe in which the sweeping block is located.

In an exemplary embodiment, the data transmission subframe may be used for transmitting or receiving, on a specific port or beam, data of at least one terminal.

In an exemplary embodiment, the data transmission subframe may have any one of the following structures:

a combination of the downlink control region and a downlink data region;

a combination of the downlink control region, the guard period and an uplink data region;

a combination of the downlink control region, the downlink data region, the guard period and the uplink control region;

a combination of the downlink control region, the guard period, the uplink data region and the uplink control region; and a combination of the downlink control region, the downlink data region, the guard period, the uplink data region and the uplink control region.

The downlink control region, the downlink data region, the guard period, the uplink data region and the uplink control region each include at least one symbol such as the orthogonal frequency division multiplexing (OFDM) symbol.

In an exemplary embodiment, if a structure of the data transmission subframe includes the downlink control region and the downlink data region, after the sweeping block is configured in the data transmission subframe, a structure of the data transmission subframe configured with the sweeping block may include the downlink control region and the downlink sweeping block or include the downlink control region, the downlink sweeping block and the downlink data region.

When the structure of the data transmission subframe includes the downlink control region, the guard period and the uplink data region, after the sweeping block is configured in the data transmission subframe, the structure of the data transmission subframe configured with the sweeping block may include the downlink control region, the guard period and the uplink sweeping block or include the downlink control region, the guard period, the uplink sweeping block and the uplink data region.

When the structure of the data transmission subframe includes the downlink control region, the downlink data region, the guard period and the uplink control region, after the sweeping block is configured in the data transmission subframe, the structure of the data transmission subframe configured with the sweeping block may be the combination of the downlink control region, the downlink sweeping block, the guard period and the uplink control region, or may be a combination of the downlink control region, the downlink sweeping block, the downlink data region, the guard period and the uplink control region, or may be a combination of the downlink control region, the downlink data region, the guard period, the uplink sweeping block and the uplink control region, or may be a combination of the downlink control region, the downlink data region, the guard period, the uplink control region and the uplink sweeping block.

When the structure of the data transmission subframe includes the combination of the downlink control region, the guard period, the uplink data region and the uplink control region, after the sweeping block is configured in the data transmission subframe, the structure of the data transmission subframe configured with the sweeping block may be the combination of the downlink control region, the guard period, the uplink sweeping block and the uplink control region, or may be a combination of the downlink control region, the guard period, the uplink sweeping block, the uplink data region and the uplink control region.

When the structure of the data transmission subframe includes the combination of the downlink control region, the downlink data region, the guard period, the uplink data region and the uplink control region, after the sweeping block is configured in the data transmission subframe, the structure of the data transmission subframe configured with the sweeping block may be the combination of the downlink control region, the downlink sweeping block, the guard period, the uplink sweeping block and the uplink control region, or may be a combination of the downlink control region, the downlink sweeping block, the downlink data region, the guard period, the uplink sweeping block and the uplink control region, or may be a combination of the downlink control region, the downlink sweeping block, the guard period, the uplink sweeping block, the uplink data region and the uplink control region, or may be a combination of the downlink control region and the downlink sweeping block, the downlink data region, the guard period, the uplink sweeping block, the uplink data region and the uplink control region, or may be a combination of the downlink control region, the downlink sweeping block, the downlink data region, the guard period, the uplink data region and the uplink control region or a combination of the downlink control region, the downlink sweeping block, the guard period, the uplink data region and the uplink control region, or may be a combination of the downlink control region, the downlink data region, the guard period, the uplink sweeping block, the uplink data region and the uplink control region, or may be a combination of the downlink control region, the downlink data region, the guard period, the uplink sweeping block and the uplink control region.

In an exemplary embodiment, the method may further include carrying downlink data or uplink data in the sweeping block for transmission. The downlink data or the uplink data is assigned or scheduled in the downlink control region within a subframe or a symbol prior to the sweeping block.

In an exemplary embodiment, a port or beam used by the downlink control region constitutes a subset or a full set of ports or beams of the sweeping block to which the downlink data belongs.

In an exemplary embodiment, a port or beam used by the downlink data or the uplink data is the subset or the full set of ports or beams of the sweeping block, and the downlink data or the uplink data is carried using a resource not occupied by the sweeping signal channel within the sweeping block.

In an exemplary embodiment, the downlink data or the uplink data is frequency division multiplexed with the sweeping signal channel within the sweeping block.

In an exemplary embodiment, the downlink control includes uplink scheduling information or downlink assignment information of data transmission resources within the sweeping block.

In an exemplary embodiment, the data transmission resources within the sweeping block and data transmission resources in the data transmission subframe are jointly assigned and indicated or independently assigned and indicated.

In an exemplary embodiment, the downlink control further includes at least one of time domain position information and frequency domain position information of the data transmission resources within the sweeping block.

In an exemplary embodiment, the time domain position information of the data transmission resources within the sweeping block is described by any one of the following:

an absolute time offset between the sweeping block and a data transmission subframe in which the downlink control is located, where the absolute time offset may be a number of offset symbols or absolute offset time;

an absolute time offset between the subframe in which the sweeping block is located and the data transmission subframe in which the downlink control is located and the position of the sweeping time block in the subframe; and an index of the subframe in which the sweeping block is located and the position of the sweeping time block in the subframe.

The position of the sweeping time block in the subframe refers to the information of symbols occupied by the sweeping block in the subframe, or the offset information between the sweeping block and the boundary of the subframe in which the sweeping block is located.

In an exemplary embodiment, the sweeping blocks are mapped at equal intervals onto the data transmission subframe.

In an exemplary embodiment, the sweeping blocks are mapped at equal intervals onto the data transmission subframe in the manner described below.

All sweeping blocks within the sweeping period T are divided into N groups, each of the N groups is mapped onto the data transmission subframe at a fixed time interval, and adjacent sweeping blocks in each of the N groups are mapped at equal intervals.

Alternatively, all adjacent sweeping blocks within the sweeping period are mapped at equal intervals.

Alternatively, all adjacent sweeping blocks are mapped at equal intervals.

N may be a positive integer.

In an exemplary embodiment, each of the N groups of sweeping blocks being mapped onto the data transmission subframe at the fixed time interval may refer to that an offset between starting boundaries of first sweeping blocks within adjacent two groups of sweeping blocks is fixed.

In an exemplary embodiment, the offset between the starting boundaries of the first sweeping blocks within the adjacent two groups of sweeping blocks is equal to a ratio of the sweeping period T to N.

Figure 3:
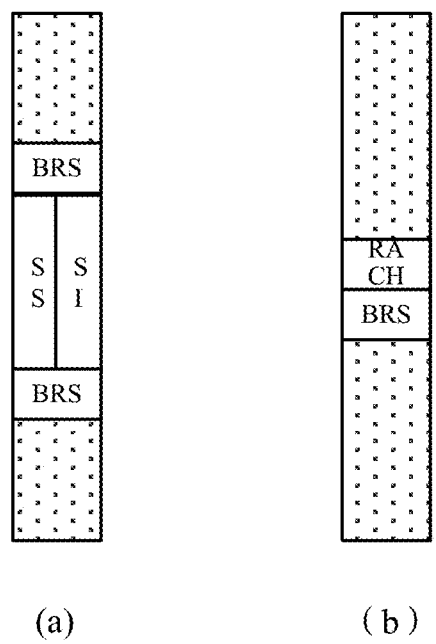
FIG. 3 is a schematic diagram illustrating an internal structure of a sweeping block according to an embodiment of the present disclosure.

The structure of the sweeping block in the embodiment is described below by way of an example. FIG. 3 is a schematic diagram illustrating an internal structure of a sweeping block according to an embodiment of the present disclosure. FIG. 3(a) is a structural example of a downlink sweeping block, and FIG. 3(b) is a structural example of an uplink sweeping block.

As shown in FIG. 3(a), in this example, the downlink sweeping block occupies 2 symbols; a synchronization signal (SS) and system information (SI) are time-division multiplexed and each occupy one symbol in time domain and 6 resource blocks (RBs) in frequency domain. The SS and the SI may also occupy different numbers of RBs. A beam reference signal (BRS) and the SS/SI are frequency division multiplexed and the BRS is used by the terminal for measurement and identification of a beam. Other multiplexing manners are also available to the sweeping block. For example, the SS, the SI and the BRS are time division multiplexed, or the SS, the SI and the BRS are frequency division multiplexed or multiplexed in other manners. In addition, the downlink sweeping block may not necessarily include all the downlink sweeping signal channels (i.e., the synchronization signal (SS), the system information (SI) and the beam reference signal (BRS)). Some downlink sweeping blocks may only include part of signals or channels in the downlink sweeping signal channels. For example, the downlink sweeping block used for an initial access may only include the SS and the SI; the downlink sweeping block used for subsequent beam tracking may include merely the BRS and only supports the terminal to measure and identify a downlink beam. Other forms of the downlink sweeping block including a part of downlink sweeping signal channels are also possible. The embodiments are described below by using an example in which all the three signals or channels are included in the downlink sweeping signal channel. The case where the downlink sweeping signal channel only includes part of the three signals or channels also falls within the scope of the present application.

In the uplink sweeping block shown in FIG. 3(b), RACH represents a random access request resource and BRS is an uplink beam reference signal. The RACH and the BRS in FIG. 3(b) are frequency division multiplexed. The present application does not exclude other multiplexing manners. In addition, the uplink sweeping block may also include merely one of the RACH and the BRS, for example, only include the BRS for uplink beam tracking. The embodiments are described below by using an example in which both the RACH and the BRS are included. The case where the uplink sweeping signal channel only includes part of the two signals or channels also falls within the scope of the present application.

The present application is described in detail below through multiple embodiments.

Embodiment 1

Figure 4:
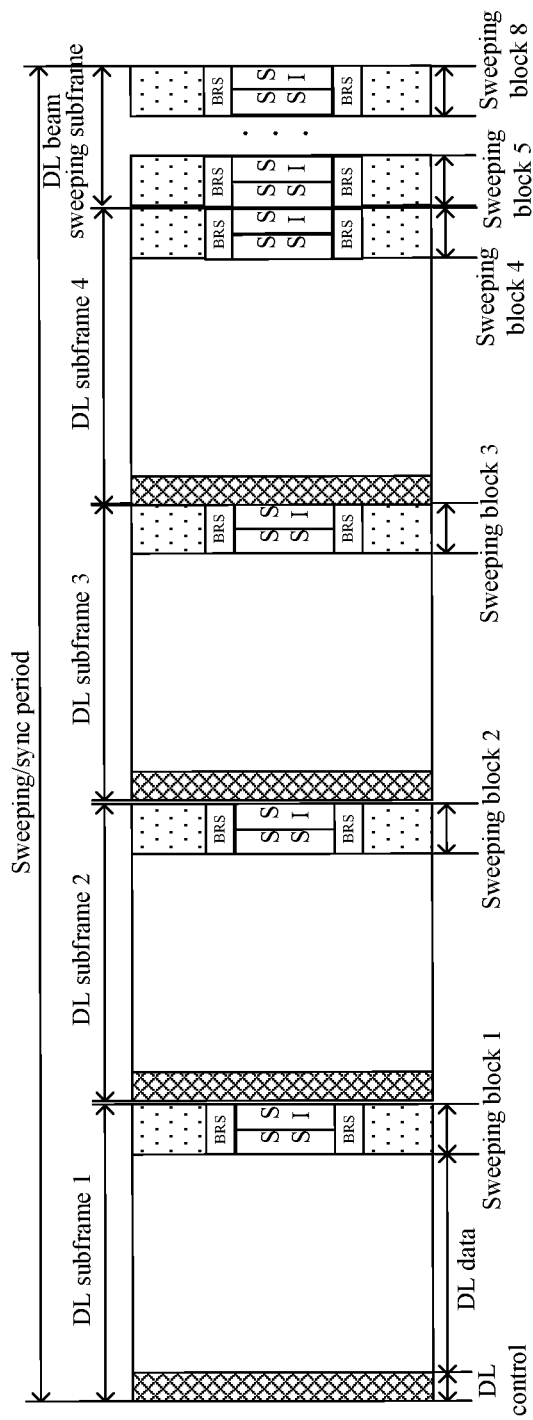
FIG. 4 is a schematic diagram illustrating a configuration of a sweeping block according to an embodiment 1.

A downlink sweeping block described in the embodiment is configured as shown in FIG. 4. In the embodiment described below, a structure of a data transmission subframe includes a downlink control region plus a downlink data region.

One sweeping/sync period (such as 5 ms) includes multiple downlink (DL) data transmission subframes, and ports or beams used by these downlink data transmission subframes are dynamically scheduled according to traffic transmission requirements. That is, when downlink data is to be transmitted in a certain port or beam direction, one downlink data transmission subframe is configured for sending a downlink control and downlink data corresponding to the certain port.

Within the sweeping period, the configuration of multiple sweeping blocks needs to be completed. These sweeping blocks are used for the sweeping signal channel transmission by polling all ports, that is, the sweeping signal channel needs to be transmitted for at least one time on each port or beam within the multiple sweeping blocks.

The sweeping block carries sweeping signal channels used for cell searching (a synchronization signal) and port of beam measurement and identification (such as a beam reference signal). The sweeping signal channel includes the following signals or channels corresponding to the port or beam: the synchronization signal, a system message and the beam reference signal. A structure of the sweeping block shown in FIG. 4 is merely an example. In this example, the sweeping block occupies 2 symbols; the synchronization signal (SS) and system information (SI) are time-division multiplexed and respectively occupy one symbol in time domain and 6 RBs in frequency domain. The SS and the SI may also occupy different numbers of RBs. The beam reference signal (BRS) and the SS/SI are frequency division multiplexed and the BRS is used by a terminal for measuring and identifying a beam. Other multiplexing manners are also available to the sweeping block. For example, the SS, the SI and the BRS are time division multiplexed, or the SS, the SI and the BRS are frequency division multiplexed or multiplexed in other manners.

The sweeping signal channel in the sweeping block is further used for indicating time domain position information of the sweeping block. The time domain position information includes a frame in which the sweeping block is located, a subframe in which the sweeping block is located, and a position of the sweeping block in the subframe. The position of the sweeping block in the subframe, that is, the symbols occupied by the sweeping block in the subframe, indirectly indicates boundary information of the subframe in which the sweeping block. In the embodiment, the time domain position information of the sweeping block is carried in the SI, that is, the SI includes a frame number of the frame in which the sweeping block is located, a subframe number of the subframe in which the sweeping block is located, and position information of the sweeping block in the data transmission subframe. Taking a sweeping block 2 in a DL subframe 2 as an example, the SI therein carries the following information: a system frame number is 0001001110, a subframe number is 2, and the position of the sweeping block in the subframe is last two symbols (symbols 12 and 13), and a boundary of the corresponding subframe can be determined. For a sweeping block in an ending sweeping subframe, the SI carries similar information. Taking a sweeping block 5 as an example, the SI indicates that the system frame number is 0001001110, the subframe number is 5, and the position of the sweeping block in the sweeping subframe is first two symbols (symbols 0 and 1).

The time domain position information of the sweeping block may alternatively be indicated by other signals within the sweeping signal channel. For example, part of the time domain position information is indicated by the synchronization signal. In an example where one radio frame includes 10 subframes, since the synchronization signal may appear in any subframe, synchronization signal sequences may be divided into 10 groups and a mapping relationship between the synchronization signal sequence groups and the subframe numbers is predefined. The terminal obtains the subframe number by detecting the synchronization signal. In addition to the above manner of indicating the subframe number by different sequence resources, a frequency domain position of the synchronization signal is another possible option for indicating the synchronization signal. For example, for the synchronization signal, multiple frequency positions are defined in each sweeping block according to the number of subframes in the radio frame and a mapping relationship between the frequency domain position and the subframe number needs to be predefined. The terminal obtains the subframe number by determining the frequency domain position of the synchronization signal. Similar to the above two manners, the position of the sweeping block in the subframe and frame number information may be indicated by the synchronization signal.

Similarly, the time domain position information of the sweeping block may be indicated by the beam reference signal (BRS), the specific scheme is similar to using the synchronization signal, which is not repeated herein.

In addition, the time domain position information of the sweeping block may also be jointly indicated by any two or three of the SS/SI/BRS. For example, the SI indicates a frame number, the SS indicates the subframe number, and the BRS indicates the position of the sweeping block in the subframe. In an exemplary embodiment, the SI carries the frame number information, each SS sequence group corresponds to the subframe number, and each BRS sequence group corresponds to the position of the sweeping block in the subframe. Other joint indication manners are also supported.

Sweeping signal channels of one or more ports or beams may be transmitted in a same sweeping block, that is, the sweeping signal channels are simultaneously transmitted by multiple radio frequency links within the same sweeping block, and the sweeping signal channels transmitted by different radio frequency links may be the same or different.

As shown in FIG. 4, there are four downlink data transmission subframes (DL subframes) 1 to 4 in the whole sweeping period, and each downlink data transmission subframe is configured with one sweeping block at the end (two symbols) of the downlink data transmission subframe. The port of the downlink data transmission subframe is a subset or a full set of ports of the sweeping block. In an exemplary embodiment, the sweeping block includes multiple ports or beams (such as ports 1 to 4) for transmitting the sweeping signal channels of multiple ports or beams. The port of the downlink data transmission subframe is part (such as ports 1 and 2) or all of the multiple ports or beams of the sweeping block.

In the embodiment, only four downlink data transmission subframes are scheduled and there are eight sweeping blocks, the remaining four sweeping blocks 5 to 8 are included in a last subframe within the sweeping period, that is, all the (eight) symbols of the last downlink data transmission subframe are configured as the sweeping blocks.

In this way, all the sweeping blocks are configured within the sweeping period and distributed in each downlink data transmission subframe.

In an exemplary embodiment, other resources within the sweeping block except the sweeping signal channel may be used for further carrying the downlink data. Since the ports of the sweeping blocks 1 to 4 include ports used by the corresponding data transmission subframes, the downlink control regions in the downlink data transmission subframes may be used for scheduling the remaining resources in the sweeping blocks to transmit the downlink data. A port or beam used for the downlink control and the downlink data is a subset or a full set of ports or beams of the sweeping block, but it is not limited that the downlink control and the downlink data use a same port or beam.

In an exemplary embodiment, downlink resources (shown in a dotted portion of FIG. 4) in the sweeping block may be jointly numbered and scheduled with downlink data channel resources in the original downlink data transmission subframe and adopt a same modulation and coding scheme as the downlink data channel resources. For example, original downlink data transmission resources include 50 RBs and resources which may be used for transmitting the downlink data within the sweeping block include 10 RBs. The 60 RBs are jointly numbered and RB resources for receiving the downlink data are indicated to the terminal. For example, the downlink data of a UE1 occupies RB 3 to RB4, and the downlink data of a UE2 occupies RB60 to RB64. It should be noted that the first 50 RBs and the last 10 RBs have different time domain resources. The last 10 RBs only occupy 2 symbols in the time domain. Therefore, when a base station performs downlink scheduling, the base station needs to indicate a width and a starting position of the RB in the time domain. For example, the base station indicates that a DL subframe 1 occupies 14 symbols in total, the downlink control region occupies 2 symbols, the downlink data region occupies 10 symbols, the sweeping block occupies 2 symbols, the RB3 to RB4 occupied by the UE1 occupy 10 symbols in the time domain, and the RB60 to RB65 occupied by the UE2 occupy 2 symbols (symbols 12 and 13) in the time domain and start from a symbol 12 (the symbols are numbered as symbols 0 to 13).

For downlink data resources (10 RBs) within the sweeping block, if frequency domain positions of the 10 RBs has been predefined by a system, merely the RB numbers and the above time domain positions are needed to be indicated to the UE. If the frequency domain positions of the 10 RBs are not predefined by the system, the frequency domain positions of the RBs need to be further indicated. For example, the 10 RBs are distributed at two ends of a system bandwidth, 5 RBs at each end.

In addition, the manners described in the embodiment are also applicable to a configuration of an uplink sweeping block. It should be noted that the downlink sweeping block shown in FIG. 4 may be replaced with an uplink sweeping block, but the difference is that a guard period for downlink-uplink switching needs to be reserved in front of the uplink sweeping block inserted in the data subframe.

Embodiment 2

Figure 5:
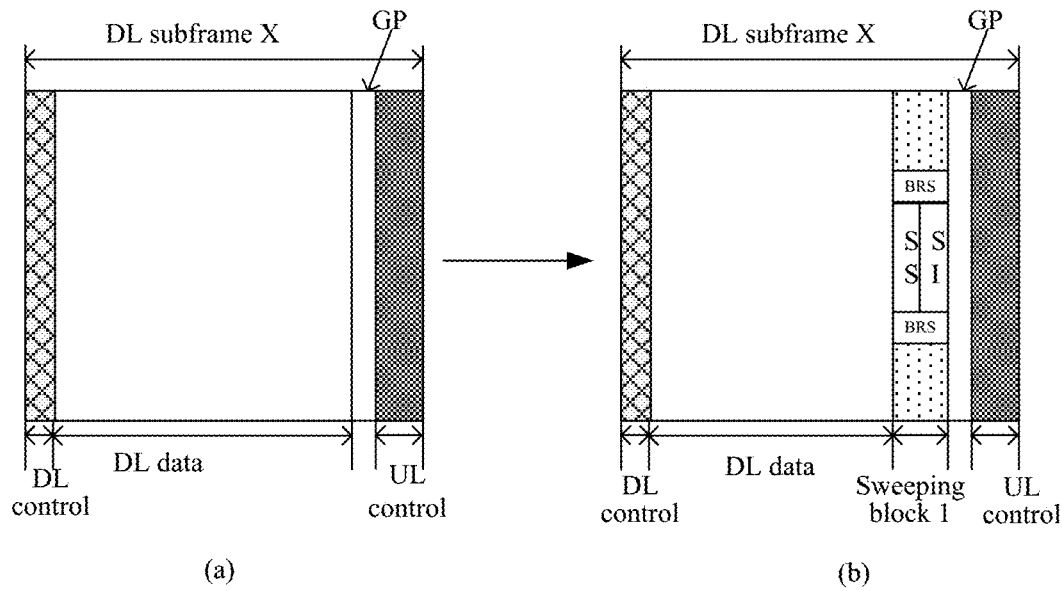
FIG. 5 is a schematic diagram illustrating a configuration of a downlink sweeping block according to an embodiment 2.
Figure 6:
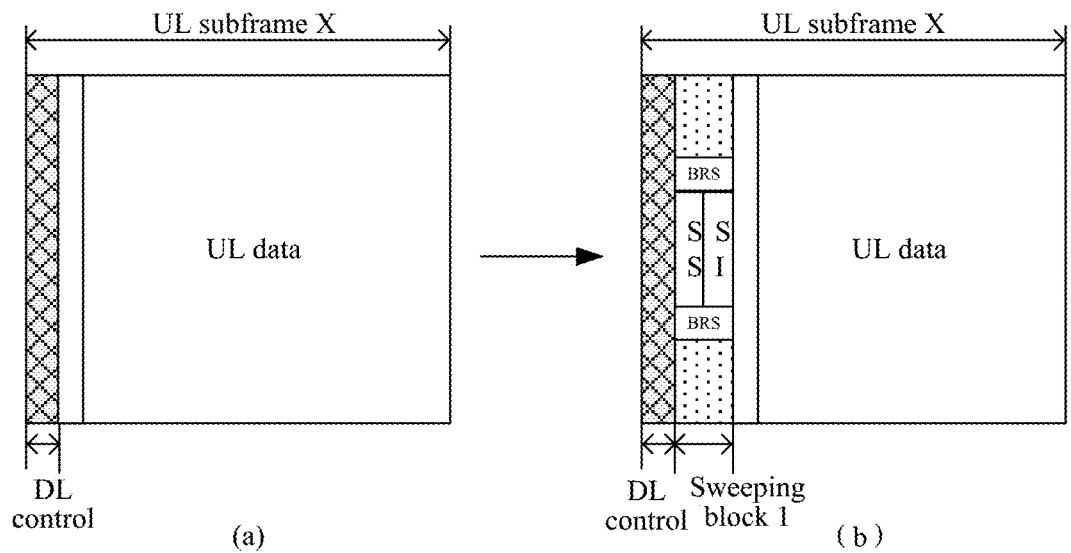
FIG. 6 is a schematic diagram illustrating another configuration of the downlink sweeping block according to the embodiment 2.

In the embodiment 1, a downlink data transmission subframe is taken as an example. However, each data transmission subframe may also be of other types within a sweeping period. FIG. 5 (a) shows a self-contained downlink data transmission subframe, that is, an end of the subframe includes a guard period (GP) and an uplink control region. FIG. 6 (a) shows an uplink data transmission subframe. FIG. 5(a) and FIG. 6(a) each show merely one subframe, the whole structure of the sweeping period is similar to the structure in the embodiment 1. How to configure a sweeping block in the two data transmission subframes is described below. As shown in FIG. 5(b), the last two symbols of the downlink portion of the data transmission subframe are configured as a downlink sweeping block 1; or two symbols after the downlink control and before the downlink data are configured as the downlink sweeping block 1. As shown in FIG. 6(b), two symbols after the downlink control and before the downlink data may be configured as the downlink sweeping block 1. In the two frame structures, the downlink control region in the data transmission subframe can still schedule resources within the sweeping block except a sweeping signal channel for transmitting the downlink data of a same port. The relevant scheduling manner is the same as that in the embodiment 1, which is not repeated herein.

Figure 7:
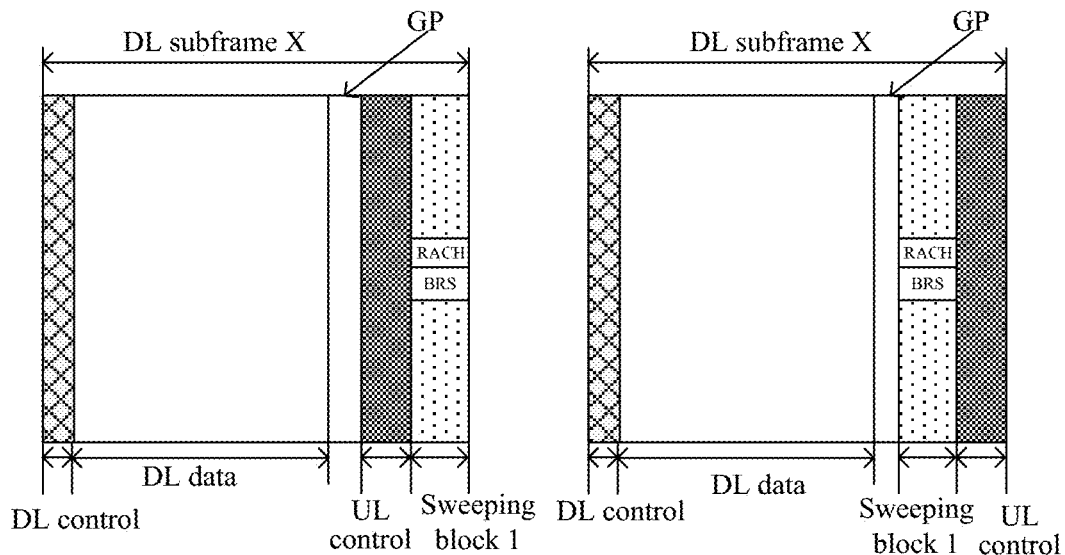
FIG. 7 is a schematic diagram illustrating a configuration of an uplink sweeping block according to the embodiment 2.

In the data subframe structures shown in FIG. 5(a) and FIG. 6(a) in the embodiment, an uplink sweeping block may also be configured. FIG. 7 shows two configuration forms of configuring one uplink sweeping block in the data transmission subframe structure in FIG. 5(a). In an exemplary embodiment, the uplink sweeping block may be configured before or after an uplink control.

Figure 8:
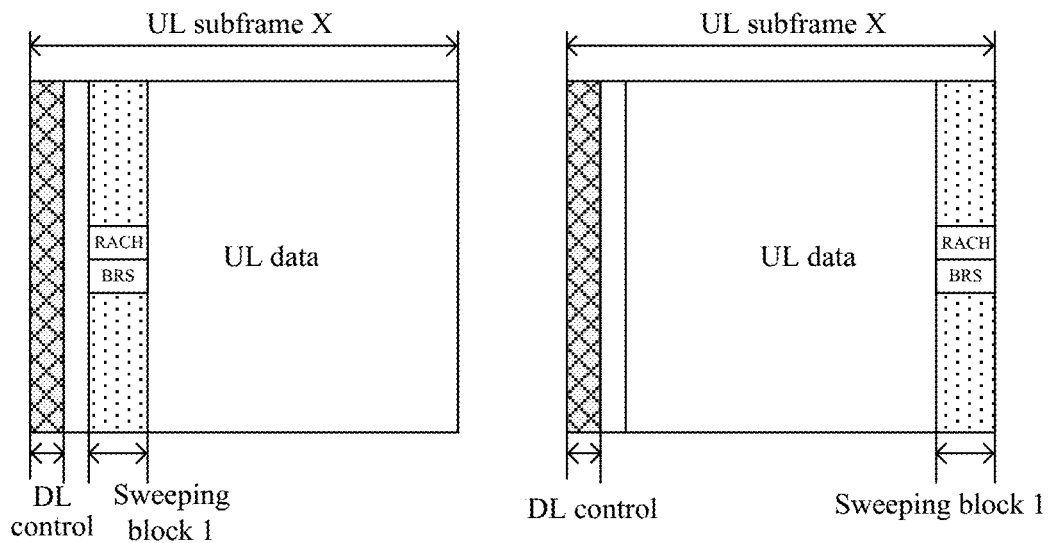
FIG. 8 is a schematic diagram illustrating another configuration of the uplink sweeping block according to the embodiment 2.

FIG. 8 shows two forms of configuring one uplink sweeping block in the data transmission subframe structure in FIG. 6(a). In an exemplary embodiment, the uplink sweeping block may be configured at a beginning of uplink data or end of uplink data.

Embodiment 3

In the embodiment, other possible configuration manners are described by using an example configuring a sweeping block in a downlink data transmission subframe.

Figure 9:
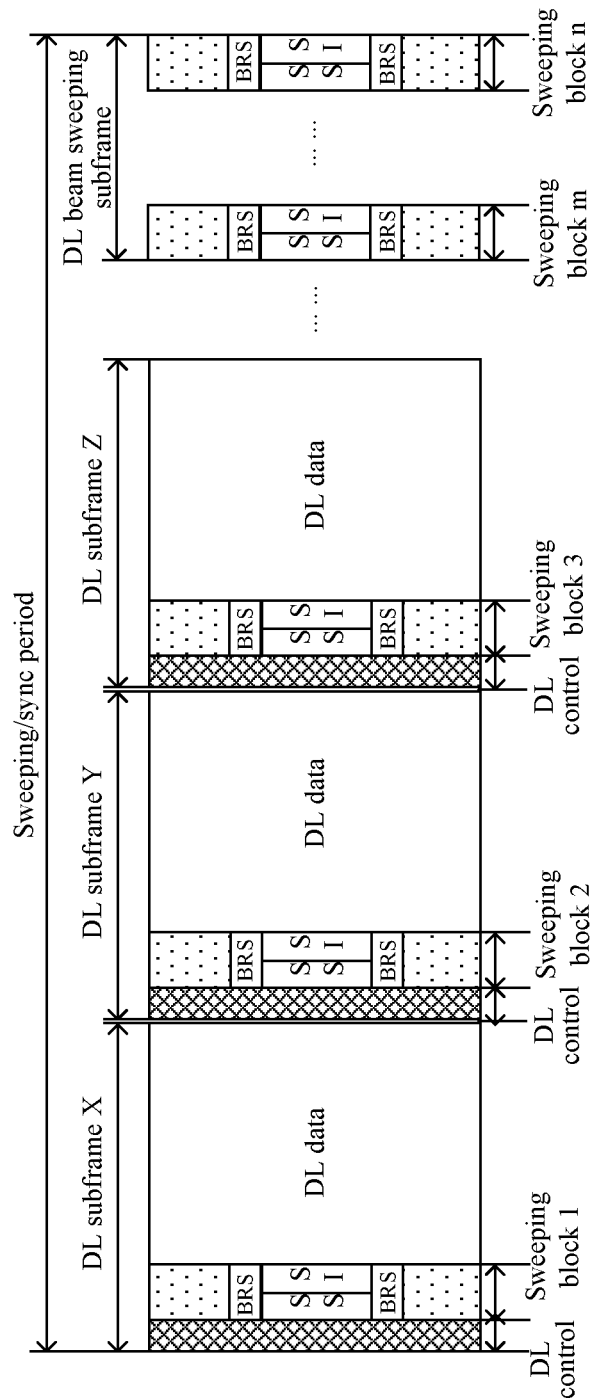
FIG. 9 is a schematic diagram illustrating a configuration of sweeping blocks according to an embodiment 3.

As shown in FIG. 9, two symbols after the downlink control and before downlink data may be configured as the sweeping block.

Figure 10:
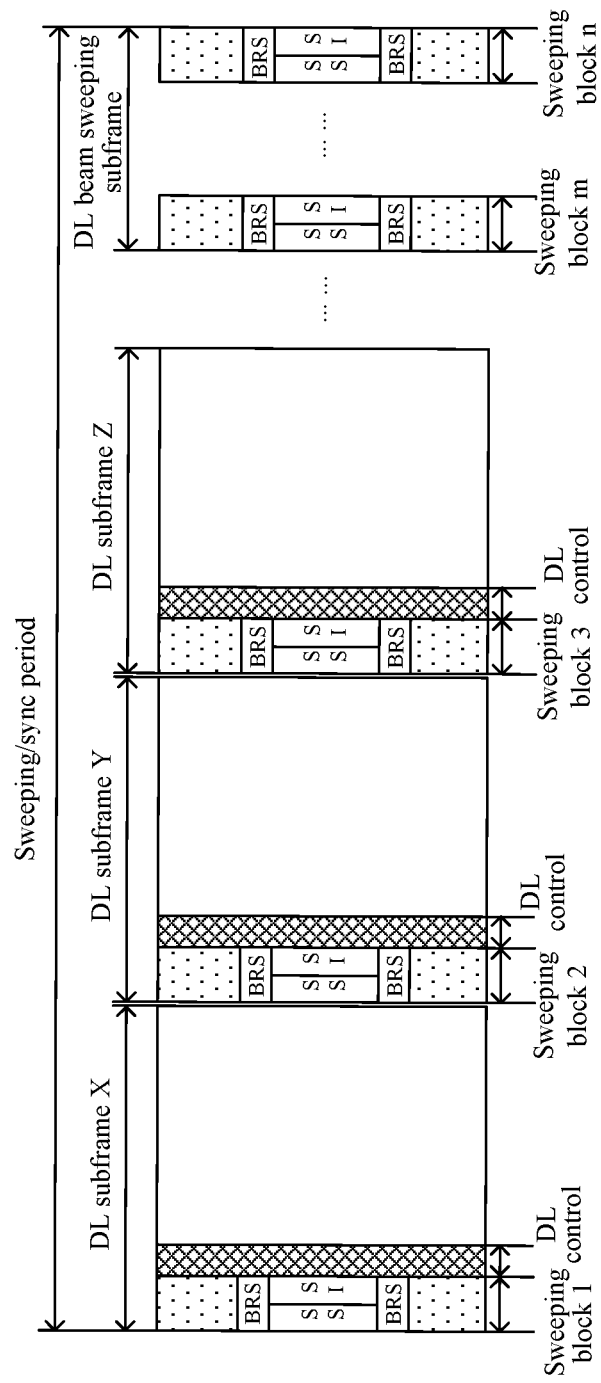
FIG. 10 is a schematic diagram illustrating another configuration of the sweeping blocks according to the embodiment 3.

As shown in FIG. 10, two symbols before a downlink control region may be configured as the sweeping block. However, in this manner, the downlink control cannot schedule resources within the sweeping block other than the sweeping signal channel.

Figure 11:
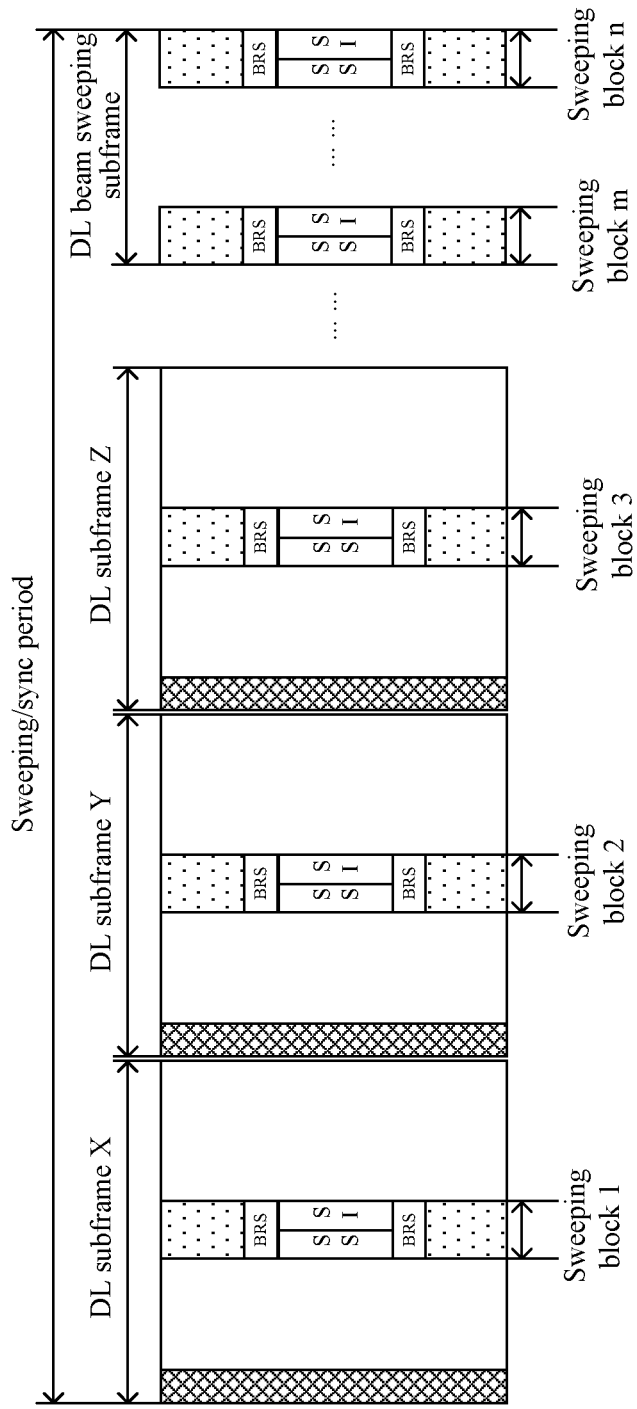
FIG. 11 is a schematic diagram illustrating yet another configuration of the sweeping blocks according to the embodiment 3.

As shown in FIG. 11, the sweeping block may be inserted in downlink data symbols, that is, the sweeping block divides a downlink data region into two parts. The downlink control region can still schedule the resources within the sweeping block except the sweeping signal channel to transmit the downlink data. Similar to the embodiment 1, downlink data transmission resources may be jointly numbered and assigned. For example, in a structure shown in FIG. 11, the symbol configuration is as follows: 4 symbols for the downlink data, 2 symbols for the sweeping block and 6 symbols for the downlink data. The first 4 symbols are divided into 50 RBs in frequency domain, the sweeping block occupies 10 RBs of downlink data transmission resources in the frequency domain, and the last 6 symbols are divided into 50 RBs in the frequency domain. The three parts are jointly numbered as 110 RB resources (RB0 to RB109). When a base station assigns downlink data resources to a terminal, the base station needs to simultaneously indicate the corresponding time-domain size and time-domain starting point of the three parts of RBs. For example, the first part occupies RB0 to RB49, 4 symbols in time domain and starts from the symbol 0; the second part occupies RB50 to RB59, 2 symbols in the time domain and starts from a symbol 4; and the third part occupies RB60 to RB109, 6 symbols in the time domain and starts from a symbol 6.

Embodiment 4

Figure 12:
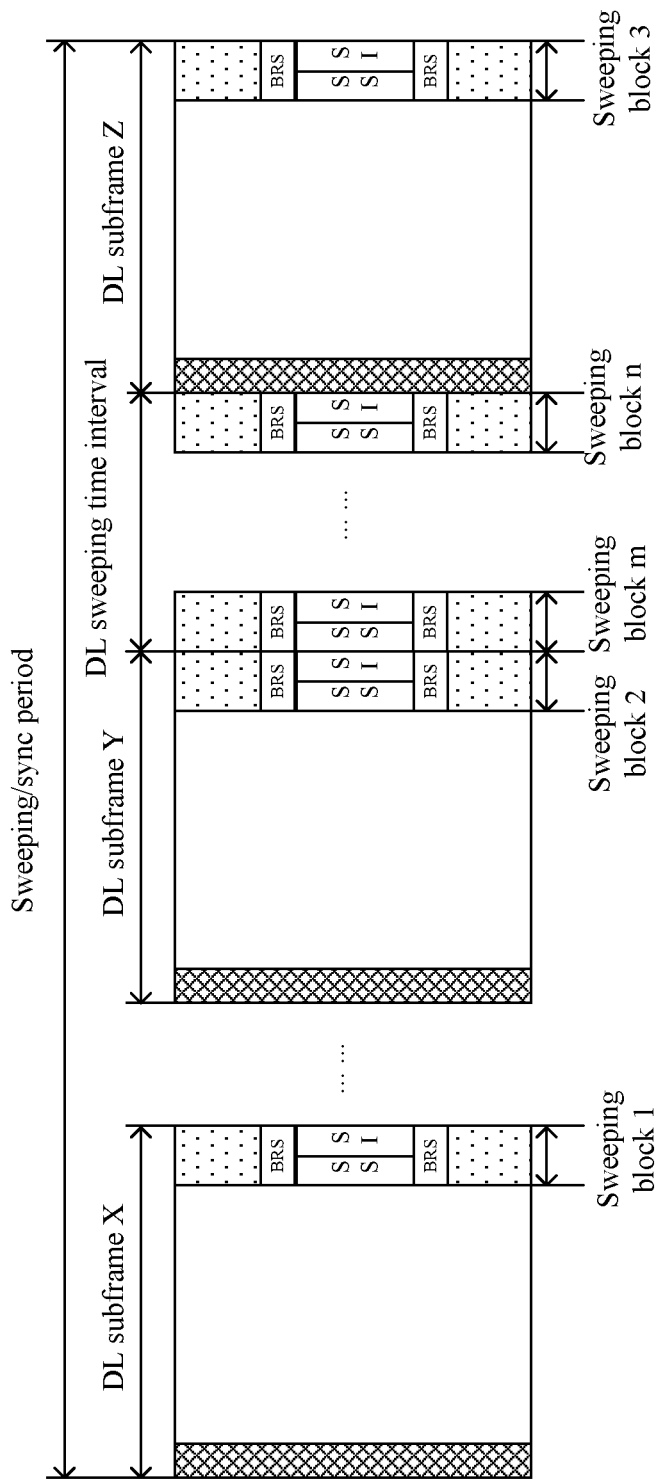
FIG. 12 is a schematic diagram illustrating a configuration of sweeping blocks according to an embodiment 4.

In the embodiment, in a configuration similar to that in the embodiment 1, a sweeping time interval aggregated by remaining sweeping blocks may be located at any position within a sweeping period (i.e., not limited in a last subframe). As shown in FIG. 12, all symbols of the Nth data transmission subframe of the sweeping period are configured as a downlink sweeping block to form a downlink sweeping time interval. Other data transmission subframes are still each configured with one downlink sweeping block. In this case, only which beams are scheduled to transmit data within the sweeping period are known in advance, the sweeping time interval includes which sweeping blocks may be pre-configured.

In addition, a data transmission subframe in which no sweeping block is configured may exist within the sweeping period.

A manner for configuring the sweeping block in the embodiment is also applicable to the configuration of an uplink sweeping block. It should be noted that a guard period for downlink-uplink switching needs to be reserved before the uplink sweeping block configured in the data transmission subframe.

Embodiment 5

Figure 13:
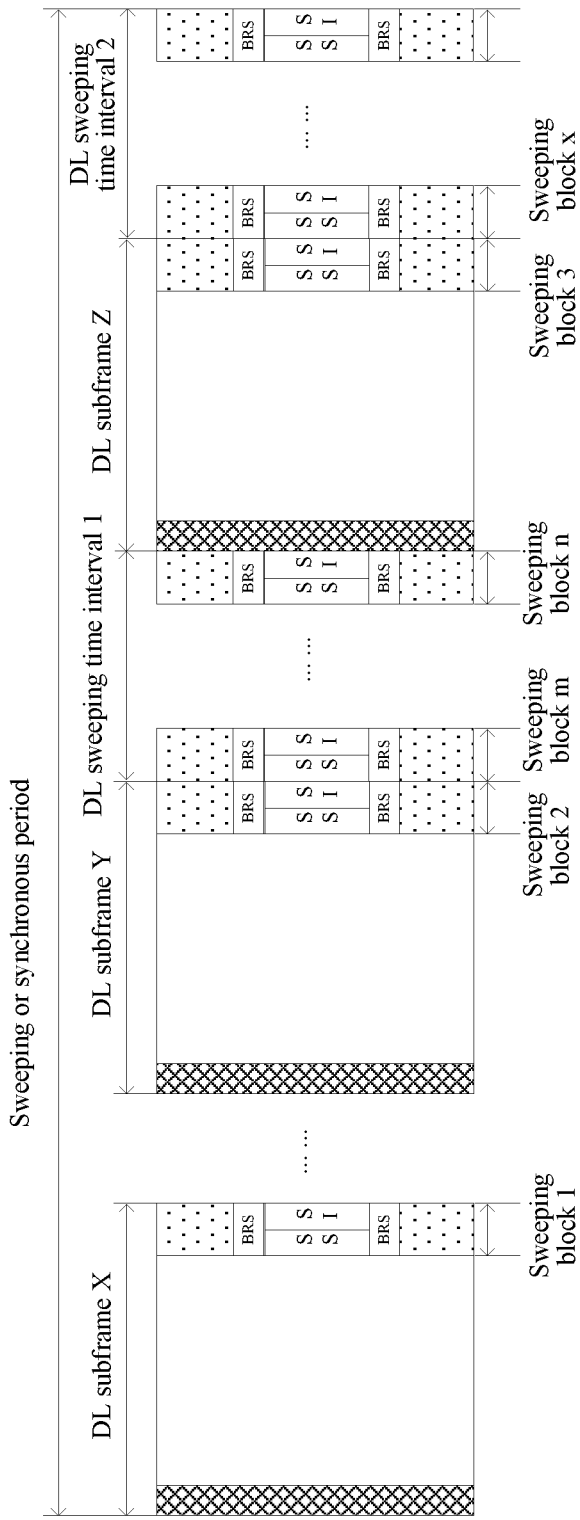
FIG. 13 is a schematic diagram illustrating a configuration of sweeping blocks according to an embodiment 5.

Based on the configuration in the embodiment 1, remaining downlink sweeping blocks may constitute one downlink sweeping time interval. Multiple sweeping time intervals may be one sweeping period. As shown in FIG. 13, there are two sweeping time intervals 1 and 2, and the configuration of other data transmission subframes is the same as that in the embodiment 1.

The sweeping block configuring manner in the embodiment is also applicable to the configuration of an uplink sweeping block. It should be noted that a guard period for downlink-uplink switching needs to be reserved before the uplink sweeping block configured in the data transmission subframe.

In addition, in the methods described in the embodiments 1 to 5, merely one sweeping block is configured in the data transmission subframe. Configuring multiple sweeping blocks in each data transmission subframe is also supported, that is, one or more data transmission subframes within a sweeping period are configured with multiple sweeping blocks. The multiple sweeping blocks may be continuously or dispersedly configured. A port of the data transmission subframe is a subset or full set of the ports of one of the multiple sweeping blocks. Accordingly, data transmission resources within the sweeping block including the port of the data transmission subframe may be assigned or scheduled by a downlink control region in the data transmission subframe.

Embodiment 6

Figure 14:
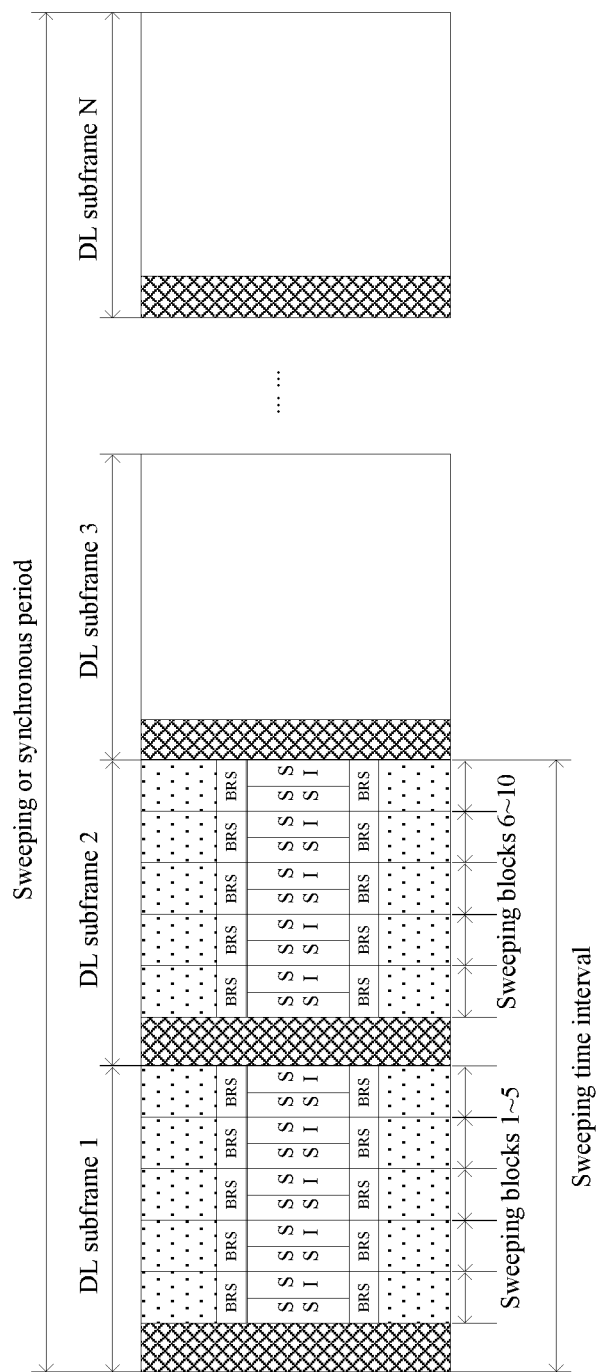
FIG. 14 is a schematic diagram illustrating a configuration of sweeping blocks according to an embodiment 6.

FIG. 14 is a schematic diagram illustrating a configuration of a sweeping block according to the embodiment.

In the embodiment, a total of 10 sweeping blocks are respectively inserted into two data transmission subframes. In the embodiment, taking a downlink data transmission subframe as an example, a DL subframe 1 and a DL subframe 2 are downlink data transmission subframes configured with the sweeping blocks, and downlink symbols except the downlink control region are all configured as the sweeping blocks. The two downlink data transmission subframes configured with the sweeping blocks constitute a sweeping time interval. In the configuration manner in the present embodiment, a more important region in the data transmission subframe is reserved, and other symbols are configured as the sweeping blocks. That is, the downlink control region currently has more important information (for example, a downlink control is feedback information for previous uplink data or scheduling information for subsequent uplink data) to be transmitted, therefore, the downlink control region is reserved in the data transmission subframe.

Similar to the embodiment, the reserved region in the data transmission subframe may not be limited to the downlink control region, and other symbols may be reserved. In this manner, the data transmission subframes are configured according to normal requirements, and the sweeping block continuously occupies some symbols in a certain order. Important data symbol must be reserved and skipped, and the sweeping block occupies the subsequent symbols.

The sweeping block configuring manner in the embodiment is also applicable to the configuration of uplink sweeping blocks. It should be noted that a guard period for downlink-uplink switching needs to be reserved before the uplink sweeping blocks configured in the data transmission subframe.

Embodiment 7

Figure 15:
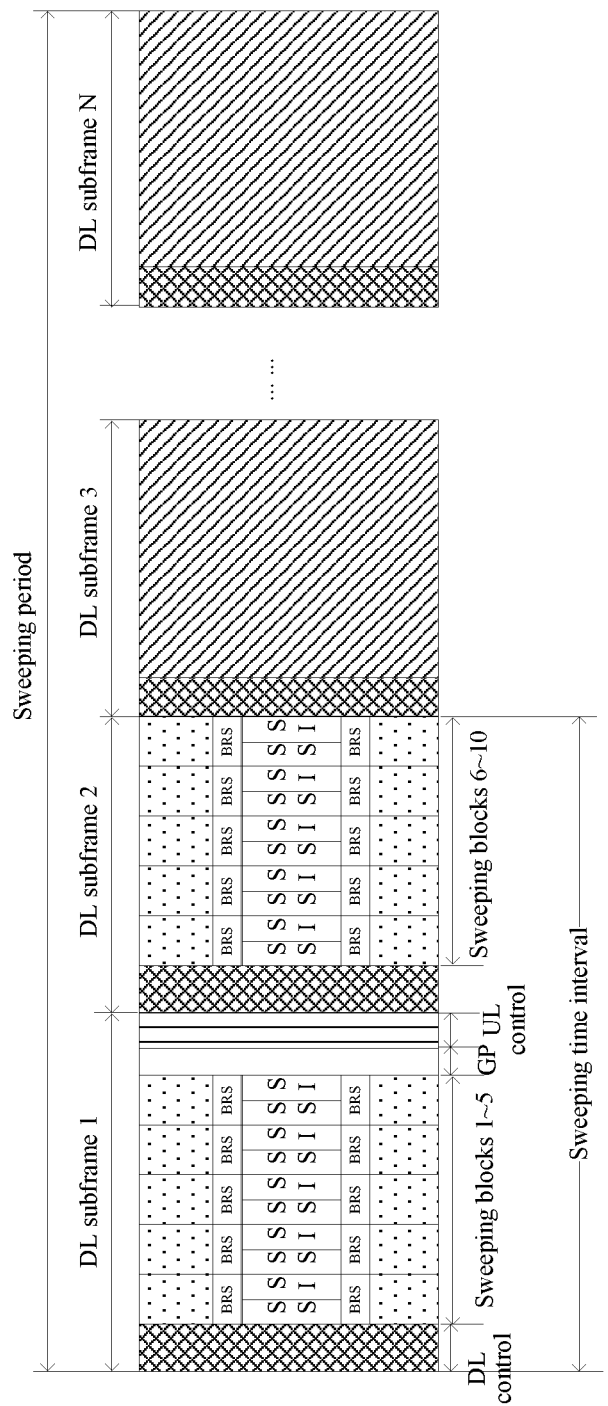
FIG. 15 is a schematic diagram illustrating a configuration of sweeping blocks according to an embodiment 7.

As shown in FIG. 15, similar to the embodiment 6, two continuous downlink data transmission subframes are configured as follows: all symbols except a downlink control region and an uplink control region are configured as sweeping blocks. The two downlink data transmission subframes constitute a sweeping time interval, and the first downlink data transmission subframe has a self-contained structure, that is, the first downlink data transmission subframe is configured with the uplink control region at the end. When downlink sweeping blocks are configured, the corresponding uplink control region and the guard period (GP) before the uplink control region are skipped.

In the embodiment, the uplink control in the first downlink data transmission subframe is just an example. In this configuration manner, if the sweeping time interval includes the uplink and downlink control regions, all the uplink and downlink control regions may be reserved or one or more uplink and downlink control regions are selectively reserved.

Embodiment 8

Figure 16:
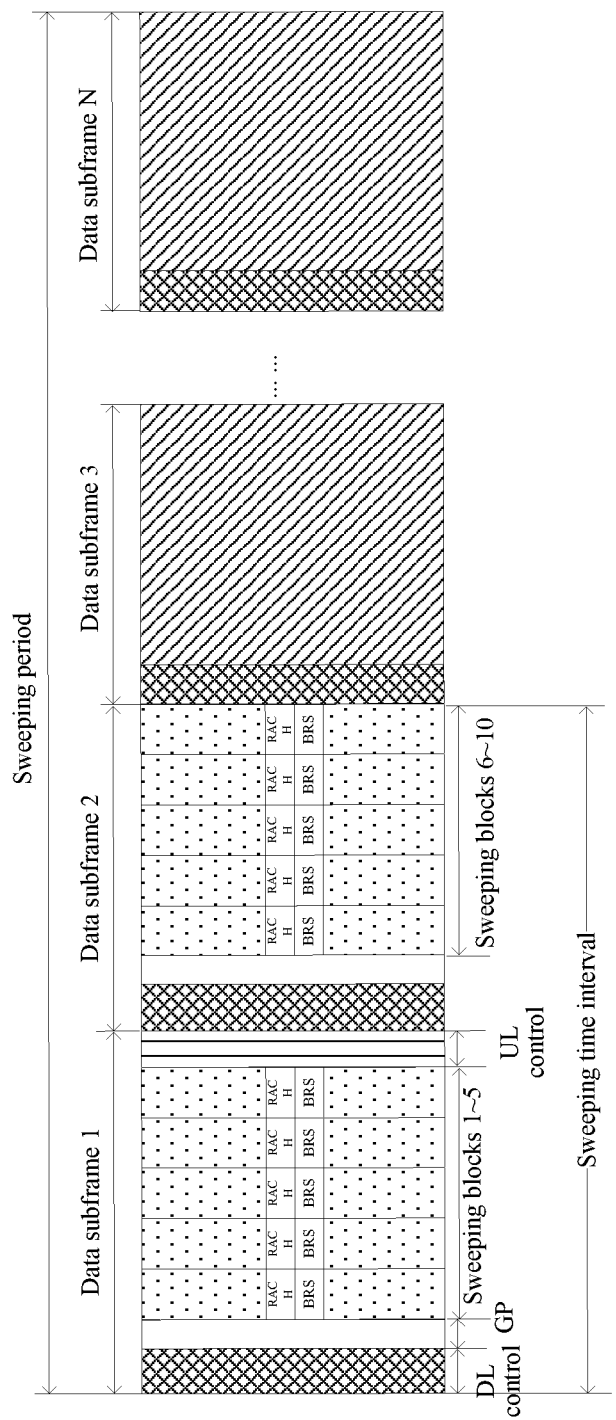
FIG. 16 is a schematic diagram illustrating a configuration of sweeping blocks according to an embodiment 8.

The embodiment describes a manner for configuring an uplink sweeping block. FIG. 16 is a schematic diagram showing that two continuous data transmission subframes within a sweeping period are configured as one sweeping time interval. Original control regions in the two data transmission subframes within the sweeping time interval are reserved, and the reserved region involve symbols occupied by uplink and downlink control regions in the first data transmission subframe and symbols occupied by the downlink control region in the second data transmission subframe. A guard period (GP) for switching from downlink transmission to uplink transmission is configured between the downlink control region and the uplink sweeping blocks.

Embodiment 9

Figure 17:
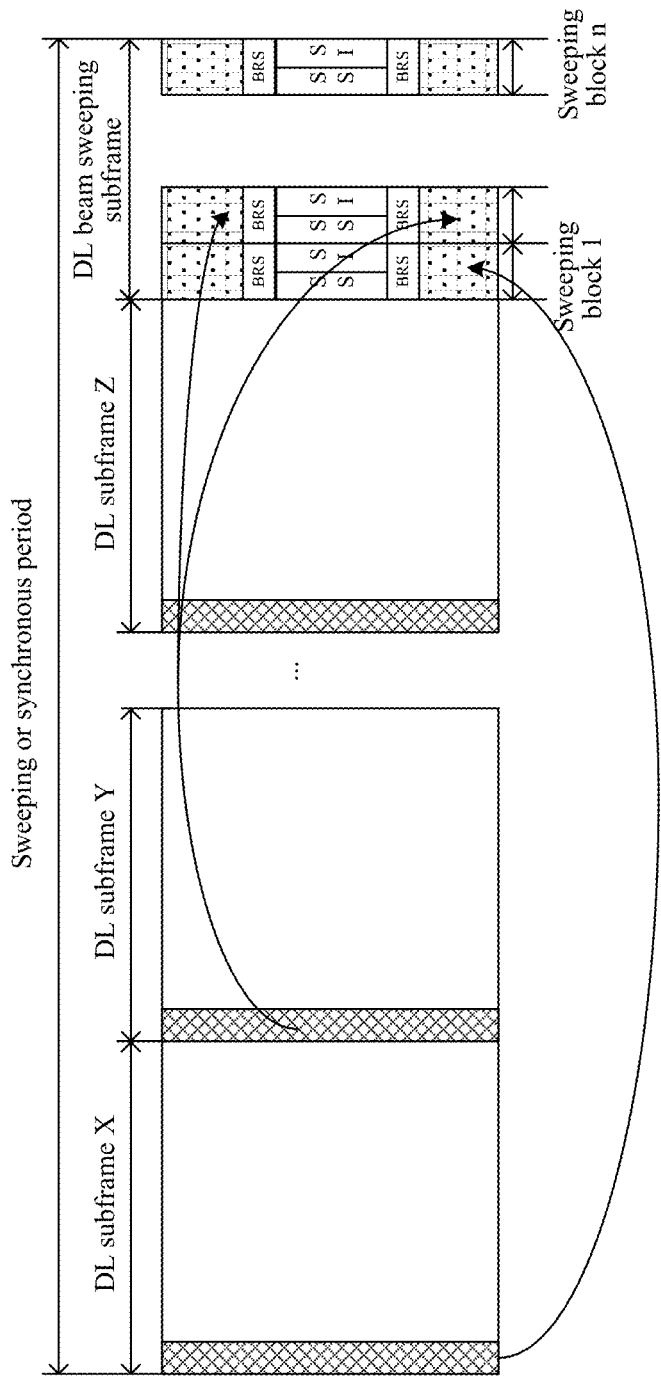
FIG. 17 is a schematic diagram illustrating a configuration of sweeping blocks according to an embodiment 9.

FIG. 17 illustrates a manner for configuring a sweeping block in the embodiment.

In a case where all sweeping blocks are aggregated into a sweeping time interval, a relative position of the sweeping time interval within a sweeping period may be arbitrarily configured. In an exemplary embodiment, as shown in FIG. 17, the sweeping time interval is configured at the last subframe within the sweeping period. In this case, a downlink control in a previous downlink data transmission subframe may schedule downlink data resources within the sweeping block with a same port, that is, resources other than the sweeping signal channel within the sweeping block. The cross-subframe assignment of downlink data is indicated by arrows in FIG. 17.

In an exemplary embodiment, a port of a DL subframe X is a subset of ports of the sweeping block 1. In addition to the downlink data in the downlink data transmission subframe, a downlink control region in the DL subframe X also schedules downlink data transmission resources in the sweeping block 1. The two resources may be respectively scheduled in downlink scheduling. For the downlink data within the DL subframe X, resource allocation, a modulation and coding scheme, a Hybrid Automatic Repeat equest (HARD) process number, a new data indicator (NDI), a redundancy version (RV) and the like are indicated to a UE in a conventional assignment manner.

For downlink data assignment in the sweeping block 1 of a sweeping subframe, a base station needs to indicate a time offset between the sweeping subframe in which the sweeping block is located and a data transmission subframe in which the downlink control is located (for example, the time offset is indicated by absolute time or the number of subframes, in an example of indicating the time offset by the number of subframes, the time offset is 5 subframes), and needs to indicate to the UE a relative position of the sweeping block 1 within the sweeping subframe, that is, which symbol resources are occupied by the sweeping block 1. For example, the sweeping block 1 occupies a symbol 0 and a symbol 1. With the above information, the UE may find the time domain position of the sweeping block 1.

Frequency domain information: for downlink data resources (10 RBs) within the sweeping block, if frequency domain positions of the 10 RBs has been predefined by a system, the base station merely needs to indicate the merely RB numbers and the above time position to the UE; if the frequency domain positions of the 10 RBs are not predefined by the system, specific frequency domain positions of the RBs need to be further indicated. For example, the 10 RBs are the first 5 RBs and the last 5 RBs of a system bandwidth.

The modulation and coding scheme, the HARQ process number, the new data indicator (NDI) (indicating whether a currently assigned downlink data resource carries new data or retransmitted data), the redundancy version (RV) and the like for the data transmission within the sweeping block also need to be indicated to the UE.

The manner for configuring the sweeping blocks in the embodiment is also applicable to the configuration of uplink sweeping blocks. Uplink data resources within the uplink sweeping block also need to be scheduled by a corresponding downlink control region so that the downlink control region includes both downlink data assignment in the data transmission subframe and uplink data scheduling within the sweeping block.

Figure 18:
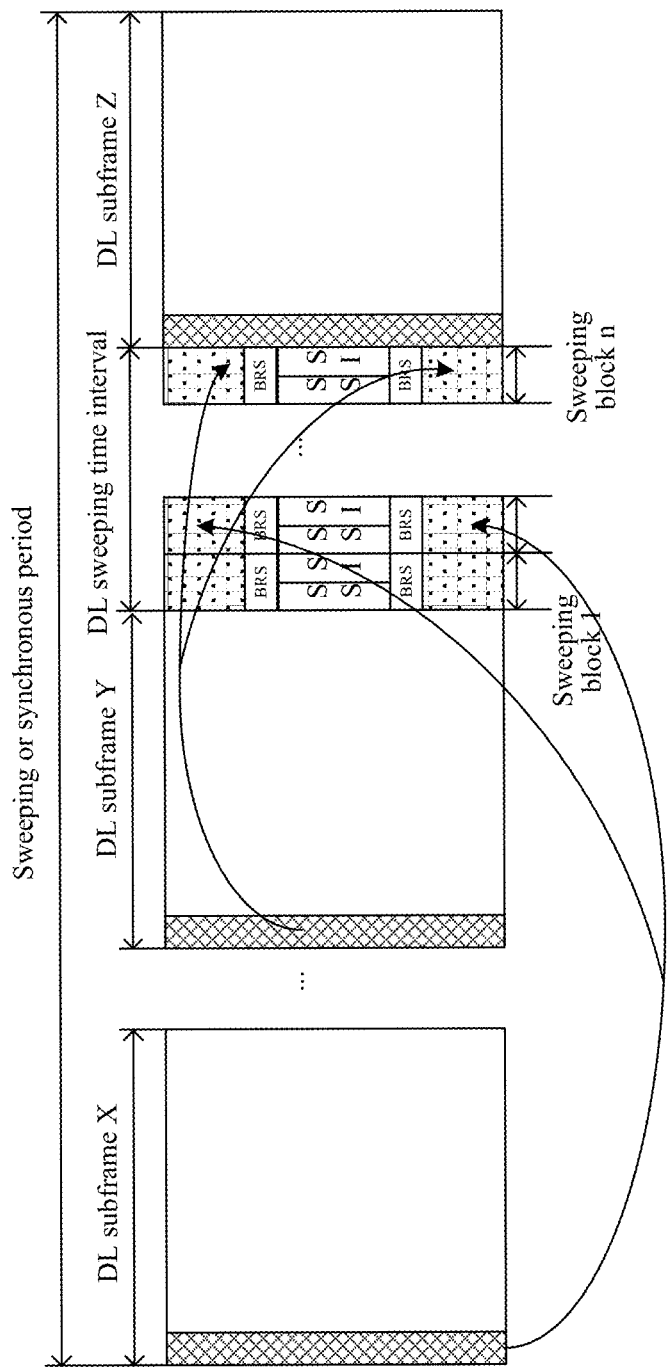
FIG. 18 is a schematic diagram illustrating another configuration of the sweeping blocks according to the embodiment 9.

The above has mentioned a case where the sweeping time interval is configured in the middle of the sweeping period. As shown in FIG. 18. A disadvantage of this case is that a data subframe (such as a DL subframe Z) after the sweeping block cannot schedule the downlink data resources in the corresponding sweeping block, resulting in insufficient use of resources. However, it is also a potential configuration manner.

Embodiment 10

Figure 19:
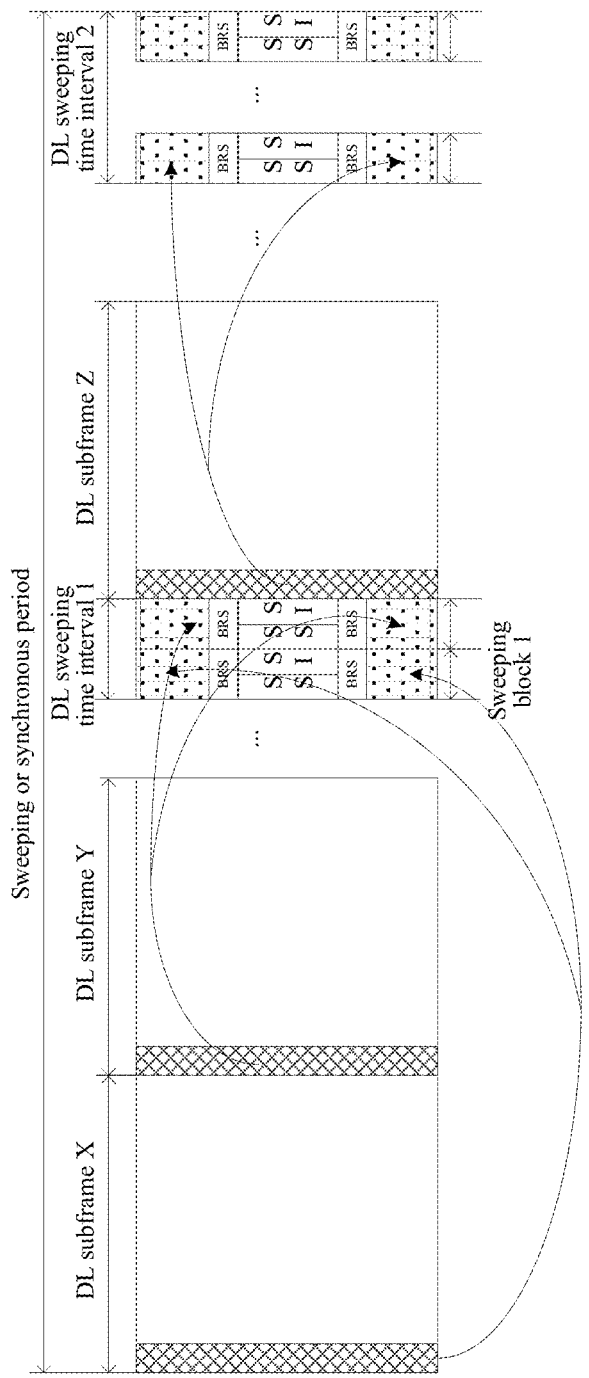
FIG. 19 is a schematic diagram illustrating a configuration of sweeping blocks according to an embodiment 10.

FIG. 19 is a schematic diagram illustrating a manner for configuring a sweeping block according to the embodiment.

All sweeping blocks are aggregated into multiple subframes, that is, the sweeping blocks are still combined into sweeping time intervals but in the multiple subframes. In this manner, the across-subframe assignment of downlink data is also involved (as indicated by arrows in FIG. 19). Compared with the structure shown in the embodiment 9, a across-subframe scheduling delay is reduced; on the other hand, a too long sweeping time interval is avoided and a latency for waiting for traffic data scheduling is decreased.

Embodiment 11

Typically, a downlink sweeping block may be referred to as a synchronization signal (SS) block, and all SS blocks in a sweeping period are referred to as a SS burst set. A period of the SS burst set is the sweeping period. The embodiment describes a case where SS blocks in a SS burst are further grouped and adjacent SS blocks in each group are mapped at equal intervals.

Figure 20:
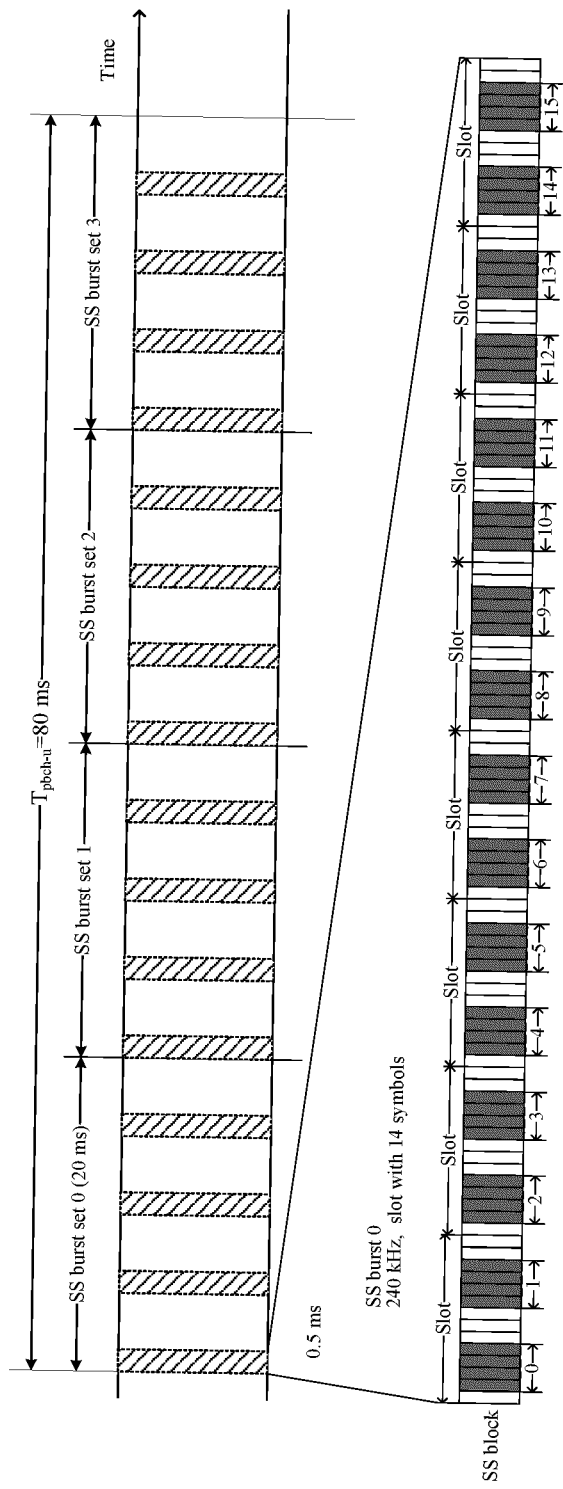
FIG. 20 is a schematic diagram illustrating a mapping structure of synchronization signal (SS) blocks under a subcarrier spacing of 240 kHz according to an embodiment 11.

In the embodiment, as shown in FIG. 20, an update period of a physical broadcast channel (PBCH) is $T_{pbch-u}$=80 ms and includes 4 SS burst sets, each of which has a period of 20 ms (i.e., one sweeping period). All sweeping blocks within the sweeping period T are divided into N groups (N=4 in the embodiment), each group of sweeping blocks is called the SS burst, and the SS burst includes one or more SS blocks mapped onto data transmission subframes at fixed time periods. The fixed time interval is 20 ms/4=5 ms and a time domain offset between starting boundaries of adjacent two groups is 5 ms. The sweeping blocks in each group are mapped onto continuous data transmission subframes and each have a duration of 0.5 ms, and the adjacent sweeping blocks are mapped at equal intervals. In an example in which a subcarrier spacing is 240 kHz, the 0.5 ms includes 8 data transmission subframes/data transmission slots and each data transmission subframe/data transmission slot has 14 symbols, and each SS block occupies 4 symbols (which include a synchronization signal and a PBCH, and may also include other reference signals, controls, data and the like). The SS blocks are mapped onto the data transmission slots in such a manner that each 14-symbol slot includes two potential SS blocks: one is mapped onto a second symbol to a fifth symbol, and the other is mapped onto a ninth symbol to a twelfth symbol. The above mapping structure is repeated in other slots. The above-mentioned potential SS block means that the SS block mapping positions shown in the figure are all possible resources carrying the SS block. Whether a base station sends the SS block on each SS block resource depends on network requirements. When there is no SS block on some SS block resources, these resources may be configured to transmit at least one of: a downlink control, an uplink control, a guard period (GP), downlink data, a mini-slot and uplink data. In the above mapping manner, 3 symbols exist between adjacent two SS blocks in each group of SS blocks (i.e., the SS burst), that is, a time domain offset between starting boundaries of the adjacent two SS blocks is 7 symbols. In such a mapping manner, it may be ensured that, in the SS burst, each SS block is mapped onto one data transmission slot without crossing data transmission slots, so that configuration flexibility of the slots is guaranteed and the offset between the adjacent SS blocks is the same, which helps a terminal to combine the adjacent two SS blocks when the terminal detects the synchronization signal or the PBCH. If the offset between the adjacent SS blocks is not fixed, the terminal needs to blindly detect a time domain position of a next SS block, imposing high requirements on combination complexity of the terminal and blocking the combination of the SS blocks.

Figure 21:
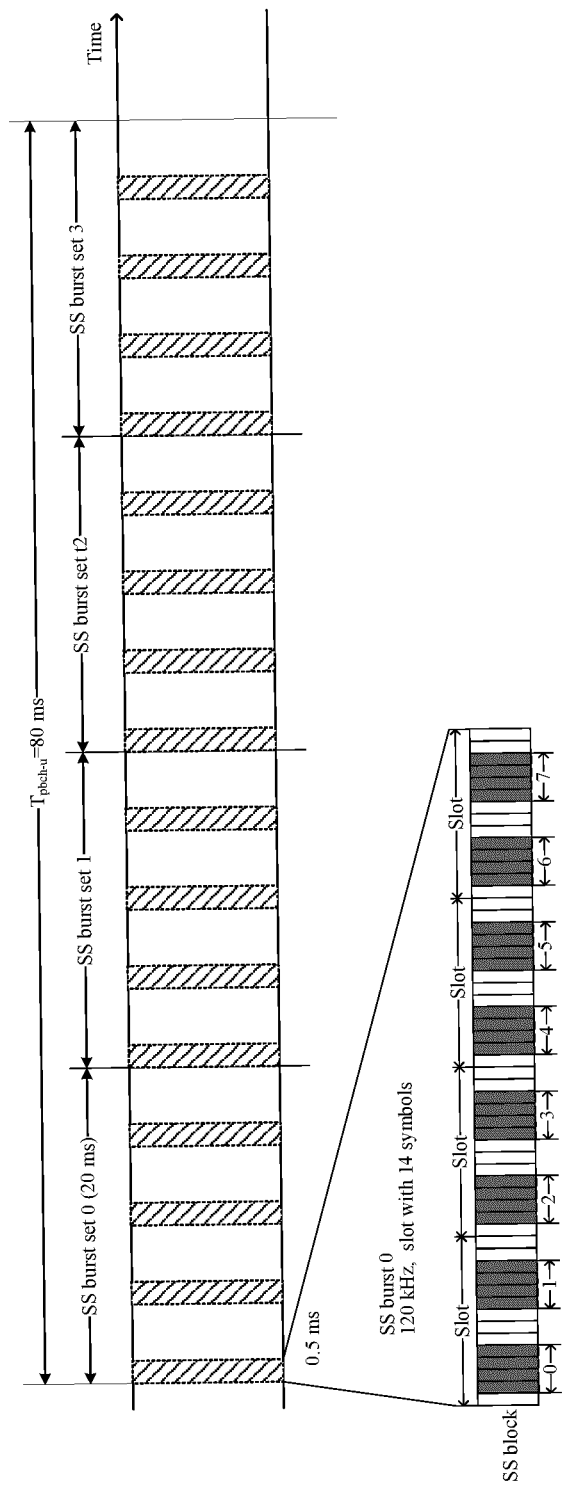
FIG. 21 is a schematic diagram illustrating a mapping structure of SS blocks under a subcarrier spacing of 120 kHz according to the embodiment 11.
Figure 22:
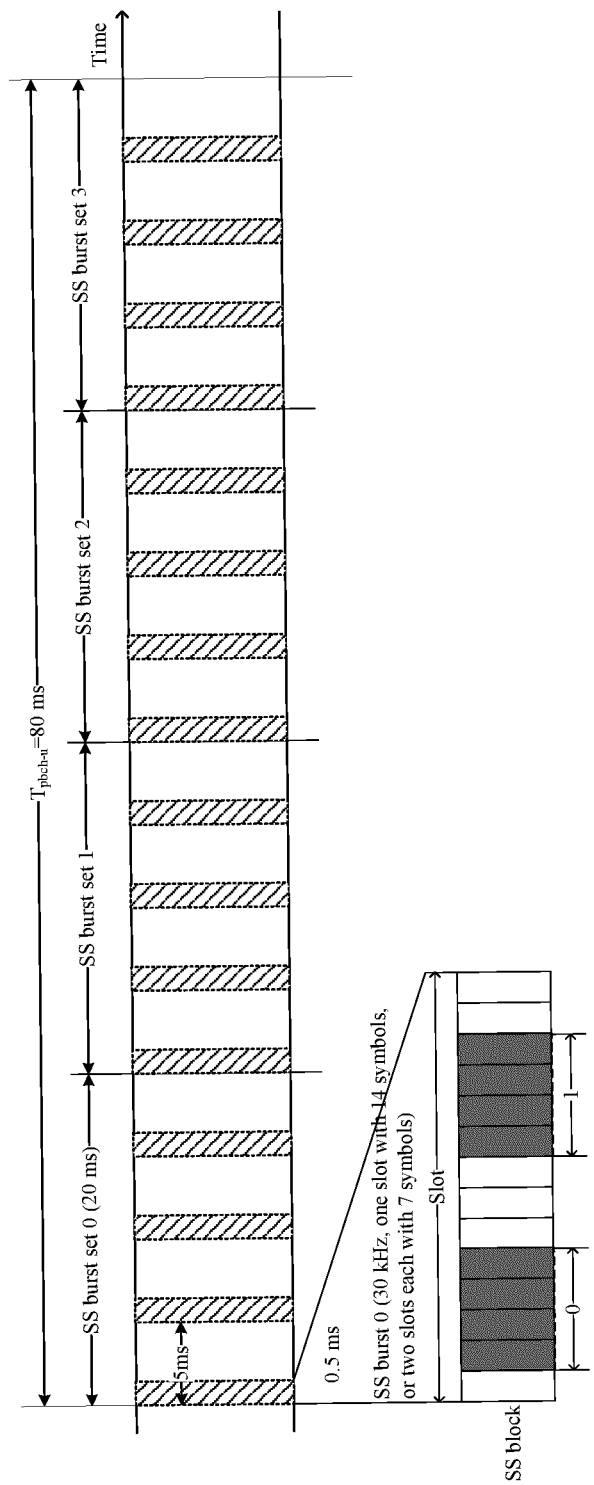
FIG. 22 is a schematic diagram illustrating a mapping structure of SS blocks under a subcarrier spacing of 30 kHz according to the embodiment 11.
Figure 23:
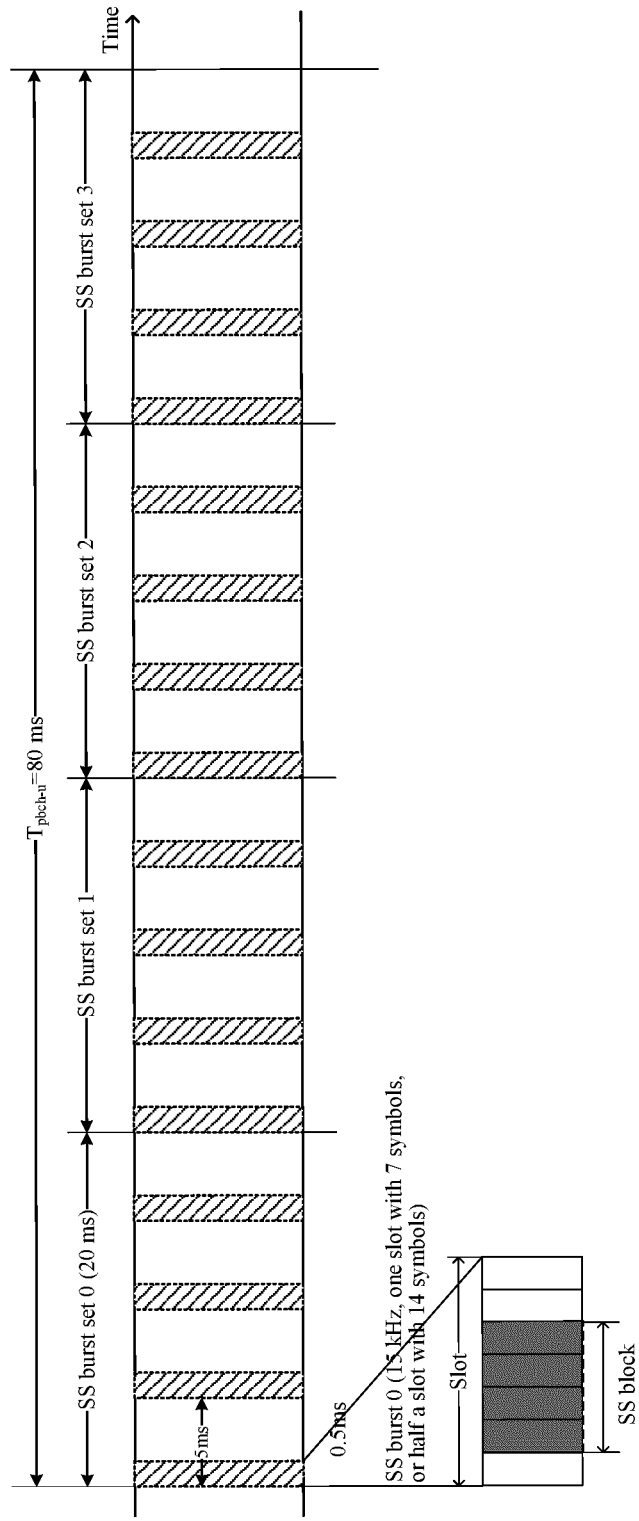
FIG. 23 is a schematic diagram illustrating a mapping structure of SS blocks under a subcarrier spacing of 15 kHz according to the embodiment 11.
Figure 24:
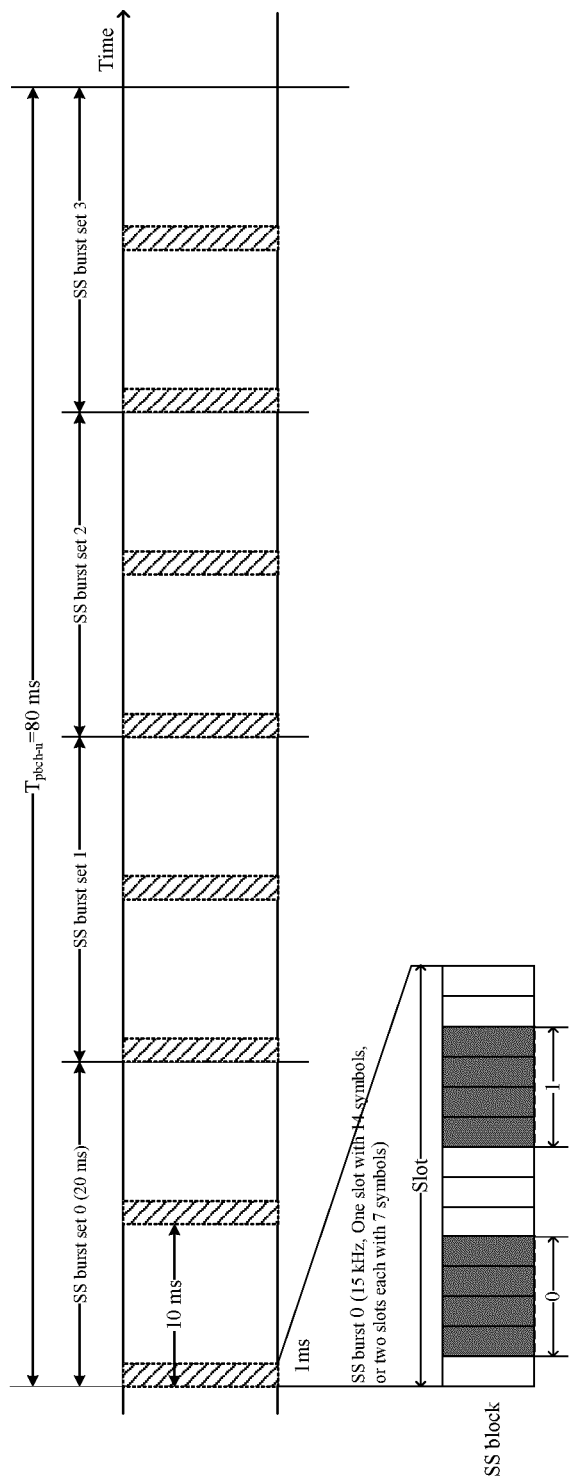
FIG. 24 is a schematic diagram illustrating another mapping structure of SS blocks under the subcarrier spacing of 15 kHz according to the embodiment 11.

The embodiment is described by using an example of the subcarrier spacing (SCS) of 240 kHz. Similarly, when other subcarrier spacing is adopted for the SS blocks, corresponding structures are shown in FIG. 21 to FIG. 24. FIG. 21 shows a structure when SCS=120 kHz, FIG. 22 shows a structure when SCS=30 kHz, and FIG. 23 and FIG. 24 show structures when SCS=15 kHz. In FIG. 23, a period of the SS burst is 5 ms, while in FIG. 24, the period of the SS burst is 10 ms. When the period (20 ms) of the SS burst is 5 ms, the whole SS burst set includes 4 SS bursts ms and each SS burst includes 1 SS block. The SS block may be mapped onto a 7-symbol slot or half a 14-symbol slot. If the SS block is mapped onto half the 14-symbol slot, the SS block may be mapped to the first half slot (mapped to symbols 1 to 4) or a second half slot (mapped to symbols 8 to 11). One of the two potential positions is selected for the SS block, but it is necessary to ensure that relative position of the SS block is the same in all SS bursts. For example, in each SS burst, the SS block occupies a position 1 (i.e., the symbols 1 to 4). In a structure in FIG. 24, the period of the SS burst is 10 ms, the whole SS burst set (20 ms) includes 2 SS bursts, and each SS burst includes 2 SS blocks.

Figure 25:
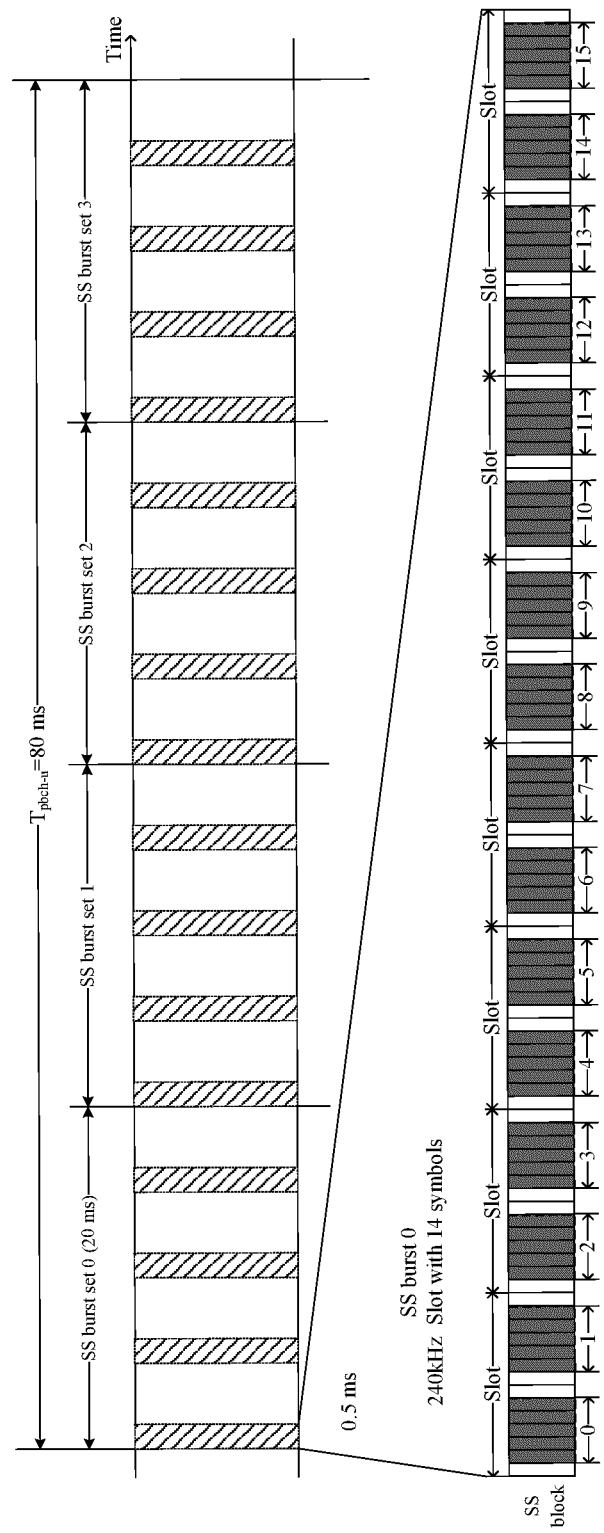
FIG. 25 is a schematic diagram illustrating another mapping structure of SS blocks under the subcarrier spacing of 240 kHz according to the embodiment 11.

The embodiment is described by using an example in which the SS block occupies 4 continuous symbols. The SS block may alternatively occupy 5 symbols. In this case, the SS blocks are still mapped at equal intervals and a specific structure is shown in FIG. 25. In this case, the SS blocks are respectively mapped onto symbols 2 to 6 and symbols 9 to 13, the adjacent SS blocks in the same SS burst are spaced apart by two symbols, and the offset is still 7 symbols.

Embodiment 12

The embodiment describes another case where SS blocks in one SS burst set are further grouped and adjacent SS blocks in each group are mapped at equal intervals.

Figure 26:
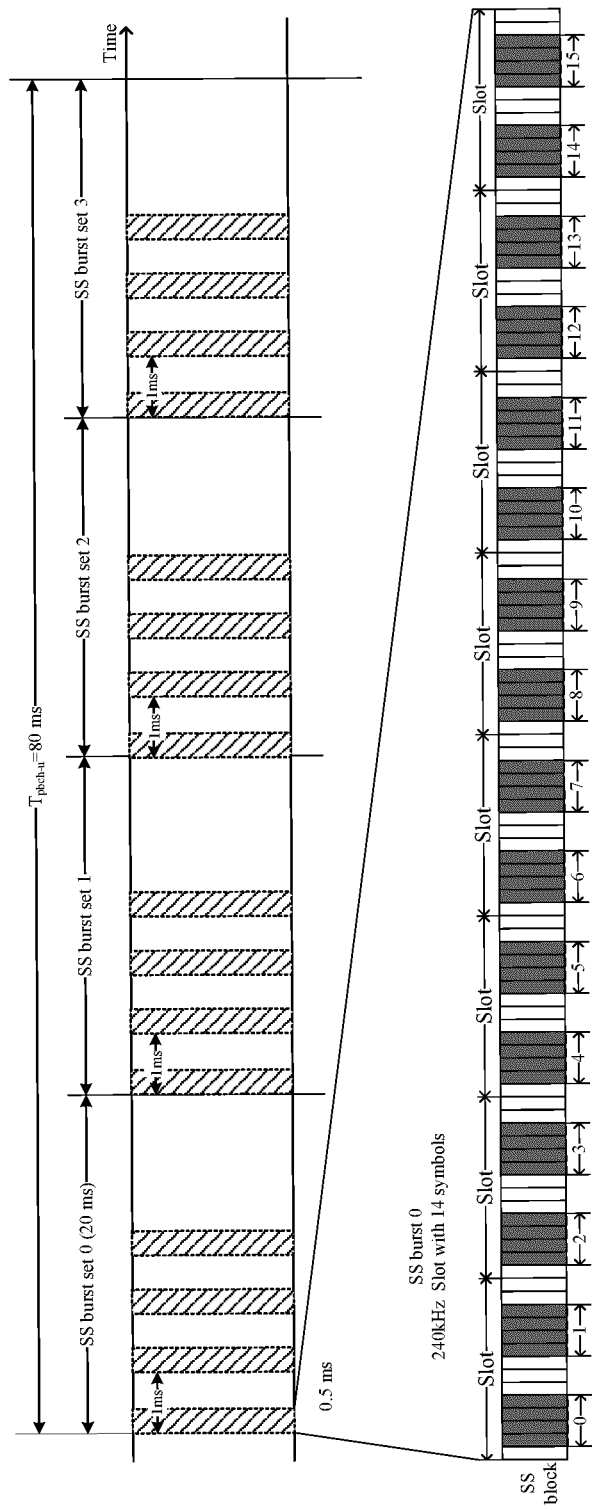
FIG. 26 is a schematic diagram illustrating a mapping structure of SS blocks under a subcarrier spacing of 240 kHz according to an embodiment 12.

As shown in FIG. 26, the embodiment 12 is different from the embodiment 11. In the embodiment 11, four SS bursts are uniformly distributed in the SS burst PBCH, that is, an offset between adjacent SS bursts is 20 ms/4=5 ms. In this configuration, an offset between adjacent two SS bursts which are located in different SS burst sets is also 5 ms. In the present embodiment, the adjacent SS bursts are still at equal intervals in the SS burst set, but the offset between the adjacent two SS bursts which are located in different SS burst sets does not require to be configures as T/N (where T is a sweeping period and N is a number of SS bursts). In the configuration of the embodiment, the SS blocks in the SS burst set are mapped in relatively concentrated manner.

An offset between starting boundaries of first SS blocks in adjacent two SS bursts is 1 ms and each SS burst lasts 0.5 ms. In the SS burst, still taking an example in which a subcarrier spacing is 240 kHz, 8 data transmission subframes/data transmission slots are included in 0.5 ms and each data transmission slot has 14 symbols, and each SS block occupies 4 symbols (which includes a synchronization signal and a PBCH, and may also include other reference signals, controls, data and the like). The SS block is mapped onto the data transmission slot in such a manner that each 14-symbol slot includes two potential SS block positions: one is from the second symbol to the fifth symbol, and the other from the ninth symbol to the twelfth symbol. The above mapping structure is repeated in other slots. The above-mentioned potential SS block position means that the SS block mapping positions shown in the figure are the all possible resources carrying the SS block. Whether a base station actually sends the SS block on this resource possible carrying the SS block depends on network requirements. When some of the resources possible carrying the SS block are not actually used for sending the SS block, these resources may be configured to transmit at least one of: a downlink control, an uplink control, a guard period (GP), downlink data, a mini-slot and uplink data. In the above mapping manner, in each group of SS blocks (i.e., the SS burst), adjacent two SS blocks are spaced apart by 3 symbols, that is, a time domain offset between starting boundaries of the adjacent two SS blocks is 7 symbols. In such a mapping manner, it may be ensured that, in the SS burst, each SS block is mapped onto one data transmission slot without crossing a boundary of the data transmission slot so that the slot configuration is flexible and the offset between the adjacent SS blocks in the SS burst is the same, which helps a terminal to combine the adjacent two SS blocks in the SS burst when the terminal detects the synchronization signal or the PBCH.

If the offset between the adjacent SS blocks is fixed, the terminal needs to blindly detect a time domain position of a next SS block, imposing high requirements on combination complexity of the terminal and blocking the combination of the SS blocks.

Figure 27:
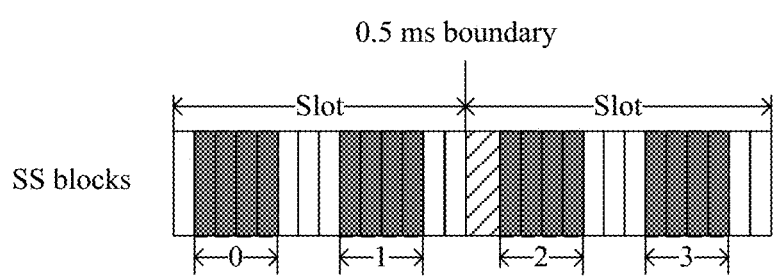
FIG. 27 is a schematic diagram of SS blocks across a boundary of a 0.5 ms duration according to the embodiment 12.

In addition, in the embodiment, the SS burst lasts 0.5 ms. An additional advantage of this configuration is as follows. There are various subcarrier spacings in the new generation of wireless communication system. Under each subcarrier spacing, a first symbol at a boundary of the 0.5 ms duration has a longer cyclic prefix than other symbols. For example, under a subcarrier spacing of 15 kHz, a length of the CP of a symbol 0 and a symbol 7 is approximately 5.2 us and the length of the CP of other symbols (1, 2, 3, 4, 5, 6, 8, 9, 10, 11, 12 and 13) is approximately 4.7 us. When a length of the SS burst exceeds 0.5 ms, as shown in FIG. 27, the SS burst will inevitably cross the boundary of the 0.5 ms duration. In this way, two SS blocks may be spaced apart by three symbols with short CP lengths, or one symbol with a long CP length and two symbols with short CP lengths. In the two cases, the terminal blindly detects the next SS block, introducing additional blind detection complexity of the terminal. Therefore, a duration of the SS burst may be defined as 0.5 ms herein.

Embodiment 13

Typically, a downlink sweeping block may be referred to as a synchronization signal (SS) block and all SS blocks in a sweeping period are referred to as a SS burst set. A period of the SS burst set is the sweeping period. The embodiment describes a case where all adjacent SS blocks in the SS burst set are mapped at equal intervals.

Figure 28:
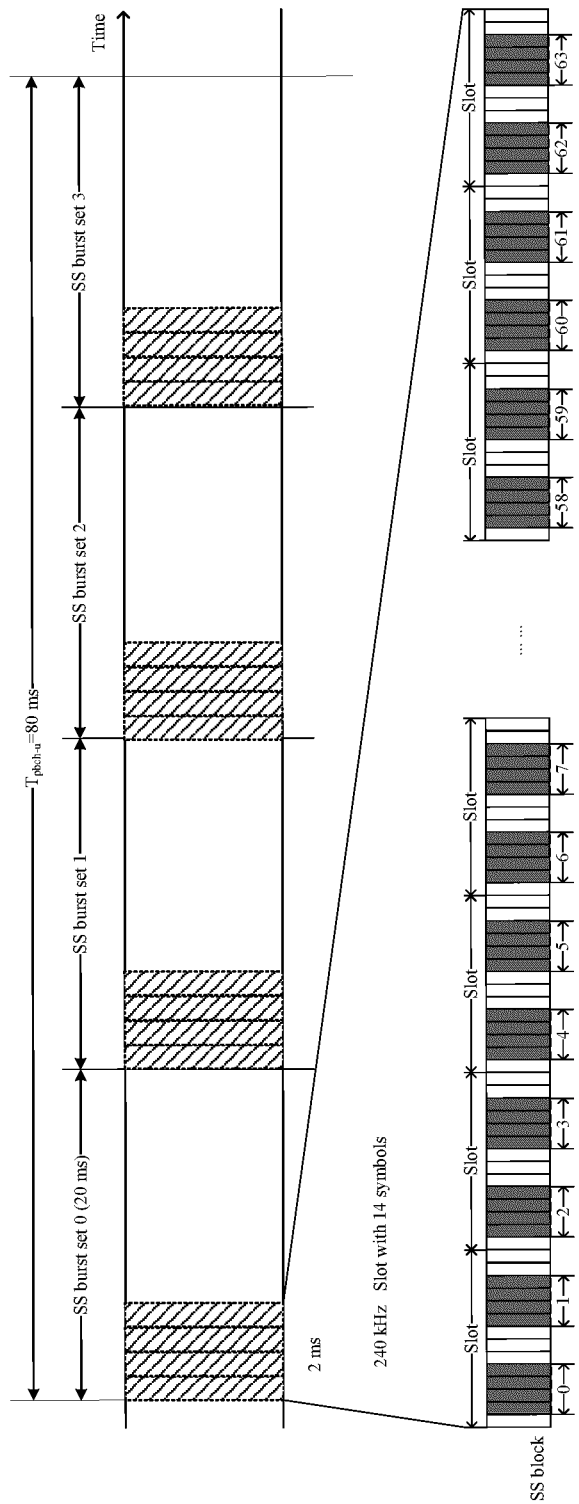
FIG. 28 is a schematic diagram illustrating a mapping structure of SS blocks according to an embodiment 13.

In the embodiment, as shown in FIG. 28, an update period of a PBCH is $T_{pbch-u}$=80 ms and includes 4 SS burst sets, each of which has a period of 20 ms (i.e., one sweeping period). All sweeping blocks/SS blocks within the sweeping period T are configured within 2 ms in a concentrated manner. In an example in which a subcarrier spacing is 240 kHz, 32 data transmission subframes/data transmission slots are included in 2 ms and each data transmission slot has 14 symbols, two SS blocks are mapped in each slot and each SS block occupies 4 symbols (which include a synchronization signal and a PBCH, and may also include other reference signals, controls, data and the like). The SS block is mapped onto the data transmission slot in such a manner that each 14-symbol slot includes two potential SS blocks: one is mapped onto the second symbol to the fifth symbol, and the other is mapped onto a the ninth symbol to the twelfth symbol. The above mapping structure is repeated in other slots. In the embodiment, all SS blocks in the SS burst set are mapped onto continuous slots. The above-mentioned potential SS block refers to that the SS block mapping positions shown in the figure are all possible resources carrying the SS block. Whether a base station actually sends the SS block on each SS block resource depends on network requirements. When some SS block resources are not actually used for sending the SS block, these resources may be configured to transmit at least one of a downlink control, an uplink control, a guard period (GP), downlink data, a mini-slot and uplink data. In the above mapping manner, 3 symbols exist between any adjacent two SS blocks within 2 ms, that is, a time domain offset between starting boundaries of the adjacent two SS blocks is 7 symbols. Such a mapping manner ensures that, in the SS burst, no SS block is mapped onto multiple data transmission slots by crossing a boundary of the data transmission slot, thereby guaranteeing the flexibility of the slot configuration and the consistency of the offset between the adjacent SS blocks, which helps a terminal to combine the adjacent two SS blocks when the terminal detects the synchronization signal or the PBCH. If the offset between the adjacent SS blocks is different, the terminal needs to blindly detect a time domain position of a next SS block, imposing high requirements on combination complexity of the terminal and blocking the combination of the SS blocks.

The embodiment is described by taking the subcarrier spacing of 240 kHz as an example. A basic mapping characteristic is that all the SS blocks in the SS burst set have a same offset, which helps to combine signal channels between SS blocks. Similarly, mapping structures of the SS blocks under other subcarrier spacings may be obtained.

Embodiment 14

Typically, a downlink sweeping block may be referred to as a synchronization signal (SS) block and all SS blocks in a sweeping period are referred to as a SS burst set. A period of the SS burst set is the sweeping period. The embodiment describes a case where all adjacent SS blocks are mapped at equal intervals.

Figure 29:
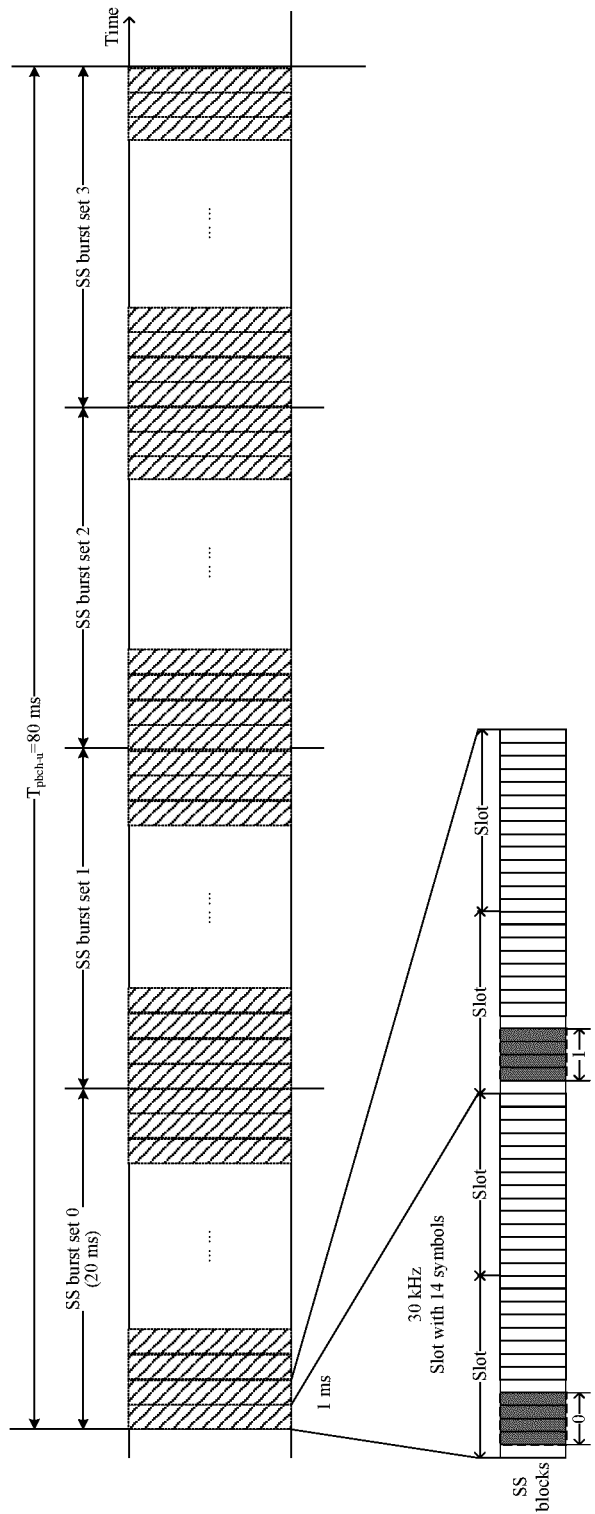
FIG. 29 is a schematic diagram illustrating a mapping structure of SS blocks according to an embodiment 14.

In the embodiment, as shown in FIG. 29, an update period of a PBCH is $T_{pbch-u}=80$ ms and includes 4 SS burst sets, each of which has a period of 20 ms (i.e., one sweeping period). Each sweeping period includes 20 sweeping blocks/SS blocks, each of which is configured in a corresponding 1 ms. FIG. 29 shows that under a subcarrier spacing of 30 kHz, each SS block occupies symbols 1 to 4 of a first slot in the corresponding 1 ms. In this way, every adjacent two SS blocks in the SS burst set are mapped onto the data transmission slots at equal intervals and adjacent two SS blocks which are located in different SS burst sets are also mapped at equal intervals.

Such a mapping manner ensures that an offset between any adjacent two SS blocks is the same (that is, 1 ms), which helps a terminal to combine the adjacent two SS blocks when the terminal detects a synchronization signal or a PBCH. If the offset between the adjacent SS blocks is different, the terminal needs to blindly detect a time domain position of a next SS block, imposing high requirements on combination complexity of the terminal and blocking the combination of the SS blocks.

The embodiment is described by using an example in which the SS blocks are mapped onto the symbols 1 to 4 of the first slot in every millisecond. However, symbols occupied by the SS block in every millisecond may be any continuous 4 symbols as long as relative positions of the symbols occupied by the SS block in every millisecond are the same. For example, in every millisecond (i.e., a transmission period of the SS block), the SS block occupies an Mth symbol to an M+3th symbol. In this case, it is also satisfied that all the SS blocks are mapped at equal intervals. In the embodiment, the transmission period of the SS block is 1 ms, and the transmission period may also be other values.

The embodiment is described by taking the subcarrier spacing of 30 kHz as an example. A basic mapping characteristic is that a same offset is ensured between any adjacent two of all the SS blocks, which helps to combine signal channels between the SS blocks. Similarly, mapping structures of the SS blocks under other subcarrier spacings may be obtained.

Embodiment 15

The sweeping block and sweeping subframe configuration manners in embodiments 1 to 11 may be combined with each other. For example, the following cases are also supported:

1. The sweeping period includes both a data transmission subframe in which one or more sweeping blocks are configured and a data transmission subframe in which all symbols outside a control region are configured as the sweeping block;

2. The sweeping period includes both the data transmission subframe in which the one or more sweeping blocks are configured and a data transmission subframe in which all symbols are configured as the sweeping block;

3. The sweeping period includes both the data transmission subframe in which all symbols outside the control region are configured as the sweeping block and the data transmission subframe in which all the symbols are configured as the sweeping block; and 4. The sweeping period includes the following three types of subframes: the data transmission subframe in which the one or more sweeping blocks are configured, the data transmission subframe in which all symbols except the control region are configured as the sweeping block, and the data transmission subframe in which all the symbols are configured as the sweeping block.

In addition, a case where different forms of uplink sweeping blocks and downlink sweeping blocks are configured within the sweeping period is also supported.

Figure 30:
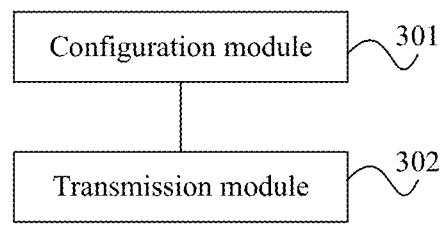
FIG. 30 is a block diagram of an information transmission apparatus based on a sweeping block according to an embodiment of the present disclosure.

FIG. 30 is a block diagram of an information transmission device based on a sweeping block according to an embodiment of the present disclosure. As shown in FIG. 30, the device includes a configuration module 301 and a transmission module 302.

The configuration module 301 is configured to configure part of or all symbols of a data transmission subframe within a sweeping period as a sweeping block.

The transmission module 302 is configured to carry a sweeping signal channel in the sweeping block for transmission.

The sweeping signal channel refers to a signal or a signal and channel to be transmitted by polling all ports or beams.

In an exemplary embodiment, the configuration module 301 may be configured to configure part of or all symbols of each of at least one data transmission subframe within the sweeping period as at least one sweeping block.

In an exemplary embodiment, the configuration module 301 may be configured to configure symbols except a reserved region of at least one data transmission subframe within the sweeping period as at least one sweeping block.

In an exemplary embodiment, after the configuration module 301 configures the symbols except the reserved region of the at least one data transmission subframe within the sweeping period as the at least one sweeping block, the data transmission subframe configured with the sweeping block has any one of the following structures:

a combination of a downlink control region and a downlink sweeping block;

a combination of the downlink control region, a guard period and an uplink sweeping block;

a combination of the downlink control region, the downlink sweeping block, the guard period and an uplink control region;

a combination of the downlink control region, the guard period, the uplink sweeping block and the uplink control region; and a combination of the downlink control region, the downlink sweeping block, the guard period, the uplink sweeping block and the uplink control region.

The downlink control region, the downlink sweeping block, the guard period, the uplink sweeping block and the uplink control region each include at least one symbol such an OFDM symbol.

In an exemplary embodiment, the configuration module 301 may be configured to configure all symbols except the reserved region of each of at least one continuous data transmission subframe within the sweeping period as a sweeping block.

After the configuration module 301 configures all the symbols except the reserved region of each of at least one continuous data transmission subframe within the sweeping period as the sweeping block, the at least one continuous data transmission subframe with the configured sweeping blocks constitute a sweeping time interval.

In an exemplary embodiment, the reserved region may include at least one of the downlink control region and the uplink control region.

In an exemplary embodiment, the configuration module 301 may be configured to configure all symbols of at least one continuous data transmission subframe within the sweeping period as the sweeping block.

After the configuration module 301 configures all the symbols of at least one continuous data transmission subframe within the sweeping period as the sweeping block, the at least one continuous data transmission subframe with the configured sweeping blocks constitute the sweeping time interval.

In an exemplary embodiment, the configuration module 301 may be configured to configure part of or all symbols of the data transmission subframe within the sweeping period as merely one sweeping block.

After the configuration module 301 configures part of or all symbols of the data transmission subframe within the sweeping period as the one sweeping block, a port or beam of the data transmission subframe constitutes a subset or a full set of ports or beams of the one sweeping block.

In an exemplary embodiment, the sweeping period may refer to a time period during which the sweeping signal channel is transmitted by polling all ports or beams for one time, and the sweeping period includes a plurality of subframes. Optionally, the sweeping period is predefined as any one of 5 ms, 10 ms, 20 ms, 40 ms and 80 ms.

In an exemplary embodiment, the sweeping block includes at least one of the downlink sweeping block and the uplink sweeping block; and the sweeping signal channel includes at least one of an uplink sweeping signal channel and a downlink sweeping signal channel. The downlink sweeping block carries the downlink sweeping signal channel used for at least one of: a cell search, and measurement and identification of a downlink port or beam. The downlink sweeping signal channel includes at least one of the followings corresponding to the downlink port or beam: a downlink synchronization signal, system information and a downlink port reference signal. The uplink sweeping block carries the uplink sweeping signal channel used for at least one of: uplink access, and measurement and identification of an uplink port or beam. The uplink sweeping signal channel includes at least one of the followings corresponding to the uplink port or beam: an uplink random access request signal and an uplink port reference signal.

In an exemplary embodiment, the sweeping period includes at least one sweeping block, and each sweeping block is used for transmitting the sweeping signal channel of at least one port and occupies at least one symbol. The sweeping signal channel is transmitted on all ports or beams in the sweeping period.

In an exemplary embodiment, the sweeping signal channel in the sweeping block is further used for indicating time domain position information of the sweeping block. The time domain position information includes at least one of: a frame in which the sweeping block is located, a subframe in which the sweeping block is located, and a position of the sweeping block in the subframe. The position of the sweeping time block in the subframe refers to information on symbols occupied by the sweeping block in the subframe, or offset information between the sweeping block and a boundary of the subframe in which the sweeping block is located.

In an exemplary embodiment, the data transmission subframe is used for transmitting or receiving data of at least one terminal on a specific port or beam.

The data transmission subframe has any one of the following structures:

a combination of the downlink control region and a downlink data region;

a combination of the downlink control region, the guard period and an uplink data region;

a combination of the downlink control region, the downlink data region, the guard period and the uplink control region;

a combination of the downlink control region, the guard period, the uplink data region and the uplink control region; and a combination of the downlink control region, the downlink data region, the guard period, the uplink data region and the uplink control region.

The downlink control region, the downlink data region, the guard period, the uplink data region and the uplink control region each include at least one symbol such as the orthogonal frequency division multiplexing (OFDM) symbol.

The structure of the data transmission subframe configured with the sweeping block is as described in the method embodiment, which is not repeated herein.

In an exemplary embodiment, the transmission module 302 may be further configured to carry downlink data or uplink data in the sweeping block for transmission. The downlink data or the uplink data is assigned or scheduled in the downlink control region within a subframe or a symbol before the sweeping block.

In an exemplary embodiment, a port or beam used by the downlink control region constitutes a subset or a full set of ports or beams of the sweeping block to which the downlink data belongs.

In an exemplary embodiment, a port or beam used by the downlink data or the uplink data is a subset or a full set of ports or beams of the sweeping block; the downlink data or the uplink data is carried using a resource not occupied by the sweeping signal channel within the sweeping block.

In an exemplary embodiment, the downlink data or the uplink data is frequency division multiplexed with the sweeping signal channel within the sweeping block.

In an exemplary embodiment, a downlink control includes uplink scheduling information or downlink assignment information of data transmission resources within the sweeping block.

In an exemplary embodiment, the data transmission resources within the sweeping block and data transmission resources in the data transmission subframe are jointly assigned and indicated or independently assigned and indicated.

In an exemplary embodiment, the downlink control further includes at least one of time domain position information and frequency domain position information of the data transmission resources within the sweeping block.

In an exemplary embodiment, the time domain position information of the data transmission resources within the sweeping block is described by any one of the following:

an absolute time offset between the sweeping block and a data transmission subframe in which the downlink control is located, where the absolute time offset may be a number of offset symbols or absolute offset time;

an absolute time offset between the subframe in which the sweeping block is located and the data transmission subframe in which the downlink control is located and the position of the sweeping time block in the subframe; and an index of the subframe in which the sweeping block is located and the position of the sweeping time block in the subframe.

The position of the sweeping time block in the subframe refers to the symbol information of the subframe occupied by the sweeping block, or the offset information between the sweeping block and the boundary of the subframe in which the sweeping block is located.

In an exemplary embodiment, the sweeping blocks are mapped at equal intervals onto the data transmission subframes.

In an exemplary embodiment, the sweeping blocks are mapped at equal intervals onto the data transmission subframes in the manner described below.

All sweeping blocks within the sweeping period T are divided into N groups, the N groups are mapped onto the data transmission subframe at a fixed time interval, and adjacent sweeping blocks in the each of the N groups of sweeping blocks are mapped at equal intervals.

Alternatively, all adjacent sweeping blocks within the sweeping period are mapped at equal intervals.

Alternatively, all adjacent sweeping blocks are mapped at equal intervals.

In an exemplary embodiment, the N groups of sweeping blocks being mapped onto the data transmission subframe at the fixed time interval may refer to that an offset between starting boundaries of first sweeping blocks within adjacent two groups is fixed.

In an exemplary embodiment, the offset between the starting boundaries of the first sweeping blocks within the adjacent two groups of sweeping blocks may be equal to a ratio of the sweeping period T to N.

The processing procedure of the above device is the same as that of the above method embodiment, which is not repeated herein.

In addition, the embodiments of the present disclosure further provide an electronic device, including the information transmission apparatus based on the sweeping block described above.

In addition, the embodiments of the present disclosure further provide an electronic device, including a processor and a memory storing instructions executable by the processor, which, when executed by the processor, perform the following operations: configuring part of or all symbols of a data transmission subframe within a sweeping period as the sweeping block; and carrying a sweeping signal channel in the sweeping block for transmission. The sweeping signal channel refers to a signal or a signal and channel to be transmitted by polling all ports or beams.

In an exemplary embodiment, when the instructions is executed by the processor, part of or all symbols of the data transmission subframe within the sweeping period are configured as the sweeping block in the manner described below.

Part of or all symbols of at least one data transmission subframe within the sweeping period are configured as at least one sweeping block.

In an exemplary embodiment, when the instructions is executed by the processor, part of or all symbols of the data transmission subframe within the sweeping period are configured as the sweeping block in the manner described below.

Symbols, except a reserved region, of at least one data transmission subframe within the sweeping period are configured as at least one sweeping block.

In an exemplary embodiment, the instructions, when executed by the processor, perform the operation described below.

Downlink data or uplink data is carried in the sweeping block for transmission. The downlink data or the uplink data is assigned or scheduled in a downlink control region within a subframe or a symbol before the sweeping block.

The processing procedure of the above electronic device is the same as that of the above method embodiment, which is not repeated herein.

In addition, the embodiments of the present disclosure further provide a machine-readable medium configured to store computer-executable instructions for executing the information transmission method based on the sweeping block described above when executed by a processor.

It should be understood by those skilled in the art that functional modules/units in all or part of the steps of the method, the system and the apparatus disclosed above may be implemented as software, firmware, hardware and appropriate combinations thereof. In the hardware implementation, the division of the functional modules/units mentioned in the above description may not correspond to the division of physical components. For example, one physical component may have several functions, or one function or step may be implemented jointly by several physical components. Some or all components may be implemented as software executed by processors such as digital signal processors or microcontrollers, hardware, or integrated circuits such as application specific integrated circuits. Such software may be distributed on a machine-readable medium (such as a computer-readable medium). The computer-readable medium may include a computer storage medium (or a non-transitory medium) and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer storage medium includes, but is not limited to, a random access memory (RAM), a read-only memory (ROM), an electrically erasable programmable read-only memory (EEPROM), a flash memory or other memory technologies, a compact disc-read only memory (CD-ROM), a digital versatile disc (DVD) or other optical disc storage, a magnetic cassette, a magnetic tape, a magnetic disk storage or other magnetic storage apparatuses, or any other medium used for storing desired information and accessed by a computer. In addition, as is known to those skilled in the art, the communication medium generally includes computer-readable instructions, data structures, program modules or other data in modulated data signals such as carriers or other transmission mechanisms, and may include any information delivery medium.

The above illustrate and describe the basic principles, main features and advantages of the present application. The present application is not limited to the embodiments described above. The above embodiments and specification describe only the principles of the present application. Various modifications and improvements may be made in the present application without departing from the spirit and scope of the present application. These modifications and improvements are within the scope of the present application.

INDUSTRIAL APPLICABILITY

The embodiments of the present application provide the information transmission method and device based on the sweeping block, under the premise of ensuring the same number of sweeping blocks within the sweeping period (i.e., without increasing the sweeping latency), the data transmission is more flexible and remaining resources within the sweeping block are easier to be utilized, thereby improving the resource utilization efficiency.

The invention claimed is:

1. A method for information transmission, the method comprising:
    configuring one or more symbols of a data transmission subframe within a sweeping period as at least one sweeping block of the data transmission subframe, wherein the data transmission subframe has 14 symbols and wherein symbols of the data transmission subframe configured as sweeping blocks are located outside a predefined region of the data transmission subframe; and
    carrying, in the at least one sweeping block of the data transmission subframe, a sweeping signal channel for transmission,
    wherein the sweeping block comprises a downlink sweeping block.

2. The method of claim 1, wherein the predefined region includes starting symbols of the data transmission subframe.

3. The method of claim 1, comprising configuring one or more symbols of the data transmission subframe within the sweeping period as a plurality of sweeping blocks, wherein the plurality of sweeping blocks are dispersedly disposed.

4. The method of claim 1, comprising configuring a plurality of symbols within the sweeping period as a plurality of sweeping blocks, wherein the plurality of sweeping blocks are configured in a plurality of sweeping time intervals, each sweeping time interval having continuous sweeping blocks, and an offset between consecutive sweeping time intervals is fixed.

5. The method of claim 1, comprising configuring one or more symbols of one or more continuous data transmission subframe within the sweeping period as a plurality of sweeping blocks.

6. The method of claim 1, wherein the sweeping signal channel in the sweeping block is further used for indicating time domain position information of the sweeping block, wherein the time domain position information comprises a frame in which the sweeping block is located, a subframe in which the sweeping block is located and a position of the sweeping block in the subframe.

7. An electronic device for information transmission, the electronic device comprising:
    an antenna, a processor, and a memory storing instructions executable by the processor, wherein the instructions, when executed by the processor, cause the processor to:
    configure one or more symbols of a data transmission subframe within a sweeping period as at least one sweeping block of the data transmission subframe, wherein the data transmission subframe has 14 symbols and wherein symbols of the data transmission subframe configured as sweeping blocks are located outside a predefined region of the data transmission subframe; and
    carry, in the sweeping block of the data transmission subframe, a sweeping signal channel for transmission, wherein the sweeping block comprises a downlink sweeping block.

8. The electronic device according to claim 7, wherein the predefined region includes starting symbols of the data transmission subframe.

9. The electronic device according to claim 7, wherein the processor is configured to configure one or more symbols of the data transmission subframe within a sweeping period as a plurality of sweeping blocks, wherein the plurality of sweeping blocks are dispersedly disposed.

10. The electronic device according to claim 7, wherein the processor is configured to configure one or more symbols within the sweeping period as a plurality of sweeping blocks, wherein the plurality of sweeping blocks are configured in a plurality of sweeping time intervals, each sweeping time interval having continuous sweeping blocks, and an offset between consecutive sweeping time intervals is fixed.

11. The electronic device according to claim 7, wherein the processor is configured to configure one or more symbols of one or more continuous data transmission subframe within the sweeping period as a plurality of sweeping blocks.

12. The electronic device according to claim 7, wherein the sweeping signal channel in the sweeping block is further used for indicating time domain position information of the sweeping block, wherein the time domain position information comprises a frame in which the sweeping block is located, a subframe in which the sweeping block is located and a position of the sweeping block in the subframe.

13. A non-transitory computer-readable storage medium storing instructions that, when executed by an electronic device with an antenna to provide transmission information, cause the electronic device to:
   configure one or more symbols of a data transmission subframe within a sweeping period as a sweeping block of the data transmission subframe, wherein the data transmission subframe has 14 symbols and wherein symbols of the data transmission subframe configured as sweeping blocks are located outside a predefined region of the data transmission subframe; and
   carry, in the sweeping block of the data transmission subframe, a sweeping signal channel for transmission, wherein the sweeping block comprises a downlink sweeping block.

* * * * *